United States Patent
Glass et al.

(10) Patent No.: US 11,573,994 B2
(45) Date of Patent: Feb. 7, 2023

(54) ENCODING ENTITY REPRESENTATIONS FOR CROSS-DOCUMENT COREFERENCE

(71) Applicant: International Business Machines Corporation, Armonk, NY (US)

(72) Inventors: Michael Robert Glass, Bayonne, NJ (US); Nicholas Brady Garvan Monath, Northampton, MA (US); Robert G. Farrell, Cornwall, NY (US); Alfio Massimiliano Gliozzo, Brooklyn, NY (US); Gaetano Rossiello, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 16/848,144

(22) Filed: Apr. 14, 2020

(65) Prior Publication Data
US 2021/0319054 A1   Oct. 14, 2021

(51) Int. Cl.
*G06F 16/30* (2019.01)
*G06F 16/35* (2019.01)
(Continued)

(52) U.S. Cl.
CPC .............. *G06F 16/35* (2019.01); *G06F 40/40* (2020.01); *G06N 3/08* (2013.01); *G06F 40/216* (2020.01); *G06F 40/284* (2020.01); *G06F 40/30* (2020.01)

(58) Field of Classification Search
CPC ...... G06F 40/30; G06F 40/216; G06F 40/284; G06F 40/40; G06F 16/35; G06N 3/08
See application file for complete search history.

(56) References Cited

U.S. PATENT DOCUMENTS 6,438,543 B1   8/2002   Kazi et al.
7,813,916 B2  10/2010   Bean
(Continued)

FOREIGN PATENT DOCUMENTS

WO   2017217489 A1   12/2017

OTHER PUBLICATIONS

Article entitled "Revisiting Joint Modeling of Cross-document Entity and Event Coreference Resolution", by Barhom et al., dated Jun. 4, 2019 (Year: 2019).*
(Continued)

*Primary Examiner* — Mahesh H Dwivedi
(74) *Attorney, Agent, or Firm* — Cantor Colburn LLP; Stosch Sabo

(57) ABSTRACT

A computer-implemented method for performing cross-document coreference for a corpus of input documents includes determining mentions by parsing the input documents. Each mention includes a first vector for spelling data and a second vector for context data. A hierarchical tree data structure is created by generating several leaf nodes corresponding to respective mentions. Further, for each node, a similarity score is computed based on the first and second vectors of each node. The hierarchical tree is populated iteratively until a root node is created. Each iteration includes merging two nodes that have the highest similarity scores and creating an entity node instead at a hierarchical level that is above the two nodes being merged. Further, each iteration includes computing the similarity score for the entity node. The nodes with the similarity scores above a predetermined value are entities for which coreference has been performed in input documents.

14 Claims, 15 Drawing Sheets

| | |
|---|---|
| Mention | A particular reference to an entity in text |
| Spelling | Character string of the reference |
| Context | Sentences / text including / surrounding reference |
| Entity | Real-world uniquely identifiable person, location, organization, concept, etc. |

(51) Int. Cl.
  *G06N 3/08* (2006.01)
  *G06F 40/40* (2020.01)
  *G06F 40/284* (2020.01)
  *G06F 40/30* (2020.01)
  *G06F 40/216* (2020.01)

(56) References Cited

U.S. PATENT DOCUMENTS

| | | | |
|---|---|---|---|
| 8,041,729 B2 | 10/2011 | Vandelle et al. | |
| 8,527,522 B2 | 9/2013 | Baron et al. | |
| 8,712,758 B2 | 4/2014 | Crouch et al. | |
| 8,862,460 B2 | 10/2014 | Cai et al. | |
| 2003/0217335 A1* | 11/2003 | Chung | G06F 16/355 707/E17.084 |
| 2009/0076799 A1 | 3/2009 | Crouch et al. | |
| 2009/0326919 A1 | 12/2009 | Bean | |
| 2010/0076972 A1* | 3/2010 | Baron | G06F 40/295 707/E17.039 |
| 2010/0228742 A1 | 9/2010 | Vandelle et al. | |
| 2011/0295594 A1 | 12/2011 | Cai et al. | |
| 2015/0112664 A1 | 4/2015 | Srinivasan | |
| 2016/0110421 A1* | 4/2016 | Gallé | G06F 16/25 707/769 |
| 2019/0354574 A1* | 11/2019 | Wick | G06F 40/216 |
| 2020/0272693 A1* | 8/2020 | Mody | G06F 16/345 |
| 2021/0034701 A1* | 2/2021 | Fei | G06N 5/046 |
| 2021/0342541 A1* | 11/2021 | Taylor | G06F 16/3328 |

OTHER PUBLICATIONS

Article entitled "Neural Coreference Resolution", by Clark, dated 2015 (Year: 2015).*
Article entitled "A Discriminative Hierarchical Model for Fast Coreference at Large Scale", by Wick et al., dated Jul. 14, 2012 (Year: 2012).*
Article entitled "Semi-automated Co-reference Identification in Digital Humanities Collections", by Croft, dated Jul. 16, 2014 (Year: 2014).*
Article entitled "Web Person Disambiguation Using Hierarchical Co-reference Model", by Xu et al., dated 2015 (Year: 2015).*
Article entitled "Cross-Document Coreference on a Large Scale Corpus", by Gooi et al., dated 2004 (Year: 2004).*
Andrews et al., "Robust Entity Clustering via Phylogenetic Inference," Proceedings of the 52nd Annual Meeting of the Association for Computational Linguistics, vol. 1, 2014, pp. 775-785.
Andrews, N. et al., "Name Phylogeny: A Generative Model of String Variation," 2012, Johns Hopkins University, 12 paages.
Artiles et al., "WePS 2 Evaluation Campaign: Overview of the Web People Search Clustering Task," 2nd Web People Search Evaluation Workshop (WePS 2009), 18th WWW Conference, vol. 9, 2009, 9 pages.
Awasthi et al., "Supervised Clustering," Advances in Neural Information Processing Systems, 2010, 9 pages.
Bagga et al., "Entity-Based Cross-Document Coreferencing Using the Vector Space Model," Proceedings of the 36th Annual Meeting of the Association for Computational Linguistics and 17th International Conference on Computational Linguistics, vol. 1, 1998, pp. 79-85.
Bojanowski et al., "Enriching Word Vectors with Subword Information," Transactions of the Association for Computational Linguistics, vol. 5, 2017, pp. 135-146.
Clark et al., "Improving Coreference Resolution by Learning Entity-Level Distributed Representations," Proceedings of the 54th Annual Meeting of the Association for Computational Linguistics (vol. 1: Long Papers), 2016, pp. 643-653.
Cucerzan, "Large-Scale Named Entity Disambiguation Based on Wikipedia Data," Proceedings of the 2007 Joint Conference on Empirical Methods in Natural Language Processing and Computational Natural Language Learning, 2007, pp. 708-716.
Curtin, "A Dual-Tree Algorithm for Fast k-means Clustering With Large k," Proceedings of the 2017 SIAM International Conference on Data Mining, Society for Industrial and Applied Mathematics, 2017, 14 pages.
Dredze et al., "Twitter at the Grammys: A Social Media Corpus for Entity Linking and Disambiguation," Proceedings of The Fourth International Workshop on Natural Language Processing for Social Media, 2016, pp. 20-25.
Dutta et al., "Cross-Document Co-Reference Resolution using Sample-Based Clustering with Knowledge Enrichment," Transactions of the Association for Computational Linguistics, vol. 3, 2015, pp. 15-28.
Finley et al., "Supervised Clustering with Support Vector Machines," Proceedings of the 22nd International Conference on Machine Learning, 2005, 8 pages.
Francis-Landau et al., "Capturing Semantic Similarity for Entity Linking with Convolutional Neural Networks," Proceedings of the 2016 Conference of the North American Chapter of the Association for Computational Linguistics Human Language Technologies, 2016, pp. 1256-1261.
Glass et al., "Discovering Implicit Knowledge with Unary Relations," Proceedings of the 56th Annual Meeting of the Association for Computational Linguistics, vol. 1, 2018, pp. 1585-1594.
Gooi et al., Cross-Document Coreference on a Large Scale Corpus., Proceedings of the Human Language Technology Conference of the North American Chapter of the Association for Computational Linguistics: HLT-NAACL 2004, 2004, 8 pages.
Green et al., "Entity Clustering Across Languages," Proceedings of the 2012 Conference of the North American Chapter of the Association for Computational Linguistics: Human Language Technologies, 2012, pp. 60-69.
Gupta et al., "Entity Linking via Joint Encoding of Types, Descriptions, and Context," Proceedings of the 2017 Conference on Empirical Methods in Natural Language Processing, 2017, pp. 2681-2690.
Haghighi et al., "Coreference Resolution in a Modular, Entity-Centered Model," Human Language Technologies: The 2010 Annual Conference of the North American Chapter of the Association for Computational Linguistics, 2010, pp. 385-393.
Haghighi et al., "Simple Coreference Resolution with Rich Syntactic and Semantic Features," Proceedings of the 2009 Conference on Empirical Methods in Natural Language Processing, vol. 3, 2009, pp. 1152-1161.
Ilse et al., "Attention-based Deep Multiple Instance Learning," 35th International Conference on Machine Learning, PMLR 80, 2018, 10 pages.
Kenyon-Dean et al., "Resolving Event Coreference with Supervised Representation Learning and Clustering-Oriented Regularization," Proceedings of the Seventh Joint Conference on Lexical and Computational Semantics (*SEM), 2018, pp. 1-10.
Kobren et al., "A Hierarchical Algorithm for Extreme Clustering," Proceedings of the 23rd ACM SIGKDD International Conference on Knowledge Discovery and Data Mining, 2017, pp. 255-264.
Lee et al., "Deterministic Coreference Resolution Based on Entity-Centric, Precision-Ranked Rules," Computational Linguistics 39.4 (2013): 885-916.
Lee et al., "Joint Entity and Event Coreference Resolution across Documents," Proceedings of the 2012 Joint Conference on Empirical Methods in Natural Language Processing and Computational Natural Language Learning, 2012, pp. 489-500.
Lee, H. et al., "Joint Entity and Event Coreference Resolution across Documents," 2012, Stanford University, 12 pages.
Malkov et al., "Efficient and robust approximate nearest neighbor search using Hierarchical Navigable Small World graphs," arXiv preprint arXiv:1603.09320, 2016, 13 pages.
Mann et al., "Unsupervised Personal Name Disambiguation," Proceedings of the Seventh Conference on Natural Language Learning, HLT-NAACL 2003, 2003, 8 pages.
Milne et al., "Learning to Link with Wikipedia," Proceedings of the 17th ACM Conference on Information and Knowledge Management, ACM, 2008, 10 pages.

(56) References Cited

OTHER PUBLICATIONS

Murty et al., "Hierarchical Losses and New Resources for Fine-grained Entity Typing and Linking," Proceedings of the 56th Annual Meeting of the Association for Computational Linguistics, Vo. 1, 2018, pp. 97-109.

Nguyen et al., "Relation Extraction: Perspective from Convolutional Neural Networks," Proceedings of NAACL-HLT 2015, ACL, 2015, pp. 39-48.

Niu et al., "Weakly Supervised Learning for Cross-document Person Name Disambiguation Supported by Information Extraction," Proceedings of the 42nd Annual Meeting on Association for Computational Linguistics, 2004, 8 pages.

Peters et al., "Deep contextualized word representations," Proceedings of NAACL-HLT 2018, 2018, pp. 2227-2237.

Raiman et al., "DeepType: Multilingual Entity Linking by Neural Type System Evolution," Thirty-Second AAAI Conference on Artificial Intelligence, 2018, pp. 5406-5413.

Rao et al., "Streaming Cross Document Entity Coreference Resolution," Proceedings of the 23rd International Conference on Computational Linguistics: Posters, Association for Computational Linguistics, 2010, pp. 1050-1058.

Rossiello, G. et al., "Learning Relational Representations by Analogy using Hierarchical Siamese Networks," 2019, IBM Research AI, 11 pages.

Sil et al., "Neural Cross-Lingual Entity Linking," Thirty-Second AAAI Conference on Artificial Intelligence, 2018, pp. 5464-5472.

Singh et al., "Large-Scale Cross-Document Coreference Using Distributed Inference and Hierarchical Models," Proceedings of the 49th Annual Meeting of the Association for Computational Linguistics (ACL): Human Language Technologies, vol. 1, ACL, pp. 793-803.

Singh et al., "Wikilinks: A Large-scale Cross-Document Coreference Corpus Labeled via Links to Wikipedia," University of Massachusetts, Amherst, Tech. Rep UM-CS-2012-015, 2012, pp. 1-14.

Vashishth et al., "Cesi: Canonicalizing Open Knowledge Bases using Embeddings and Side Information," WWW 2018: The 2018 Web Conference, ACM, 2018, 11 pages.

Wick et al., "A Discriminative Hierarchical Model for Fast Coreference at Large Scale," Proceedings of the 50th Annual Meeting of the Association for Computational Linguistics, vol. 1, ACL, 2012, pp. 379-388.

Wiseman et al., "Learning Global Features for Coreference Resolution," Proceedings of NAACL-HLT 2016, ACL, 2016, pp. 994-1004.

Xie et al., "Unsupervised Deep Embedding for Clustering Analysis," Proceedings of the 33rd International Conference on Machine Learning, 2016, 10 pages.

Yang et al., "Towards K-means-friendly Spaces: Simultaneous Deep Learning and Clustering," Proceedings of the 34th International Conference on Machine Learning, 2017, 10 pages.

Zaheer et al., "Canopy Fast Sampling with Cover Trees," Proceedings of the 34th International Conference on Machine Learning, 2017, 10 pages.

Zaheer et al., "Deep Sets," Advances in Neural Information Processing Systems (NIPS 2017), 2017, 11 pages.

Anonymous, "Learning to Agglomerate Entity Representations for Cross-Document Coreference," Association for the Advancement of Artificial Intelligence, 2018, 8 pages.

Monath et al., "Gradient-based Hierarchical Clustering using Continuous Representations of Trees in Hyperbolic Space," Research Track Paper, KDD '19, Aug. 4-8, 2019, pp. 714-722.

Monath et al., "Scalable Hierarchical Agglomerative Clustering," Research Track Paper, KDD '21, Aug. 14-18, 2021, pp. 1245-1255.

Monath et al., "Scalable Hierarchical Clustering with Tree Grafting," Research Track Paper, KDD '19, Aug. 4-8, 2019, pp. 1438-1448.

Yadav et al., "Supervised Hierarchical Clustering with Exponential Linkage," Proceedings of the 36th International Conference on Machine Learning, 2019, 11 pages.

\* cited by examiner

ENCODING ENTITY REPRESENTATIONS FOR CROSS-DOCUMENT COREFERENCE

BACKGROUND

The present invention relates generally to computer technology, and more particularly to a machine learning system configured to automatically agglomerate entity representations for performing cross-document coreference.

Data mining is a step in database knowledge discovery. Data mining generally refers to a process for automatically searching through a large amount of data for information hidden therein that has special relationality. Data mining and data analysis are important research subjects in field of information technology, upon which many sub research subjects exist. Information extraction research in natural language processing technology has provided people with a more powerful information retrieving tool to cope with the severe challenge brought by information explosion. Information extraction technology does not attempt to comprehensively understand the whole document; it simply analyzes the part containing relevant information in the document. Object coreference technology is one type of application in information extraction research, which can confirm coreference relationship in text in some degree.

SUMMARY

According to one or more embodiments of the present invention, a computer-implemented method for performing cross-document coreference for a corpus of input documents includes determining mentions in the input documents by parsing the input documents. Each mention includes a first vector and a second vector, the first vector for spelling data and the second vector for context data. The method further includes generating a hierarchical tree data structure by generating several leaf nodes, each leaf node corresponding to a respective mention that is determined. The method further includes computing, for each node, a similarity score based on the first vector and the second vector associated with each node. The method further includes populating the hierarchical tree iteratively until a root node is created. Each iteration includes merging two nodes that have the highest similarity scores, wherein merging two nodes includes creating an entity node at a hierarchical level that is above the two nodes being merged. Further, each iteration includes computing the similarity score for the entity node. The method further includes identifying the nodes with the similarity scores above a predetermined value as entities for which coreference has been performed in the input documents.

According to one or more embodiments of the present invention, a system includes a memory, and a processor coupled with the memory. The processor is programmed with machine learning algorithms to perform a method for cross-document coreference. The method includes determining mentions in the input documents by parsing the input documents. Each mention includes a first vector and a second vector, the first vector for spelling data and the second vector for context data. The method further includes generating a hierarchical tree data structure by generating several leaf nodes, each leaf node corresponding to a respective mention that is determined. The method further includes computing, for each node, a similarity score based on the first vector and the second vector associated with each node. The method further includes populating the hierarchical tree iteratively until a root node is created. Each iteration includes merging two nodes that have the highest similarity scores, wherein merging two nodes includes creating an entity node at a hierarchical level that is above the two nodes being merged. Further, each iteration includes computing the similarity score for the entity node. The method further includes identifying the nodes with the similarity scores above a predetermined value as entities for which coreference has been performed in the input documents.

According to one or more embodiments of the present invention, a computer program product includes a memory storage device having computer executable instructions stored thereon. The computer executable instructions when executed by a processing unit cause the processing unit to perform a method for performing cross-document coreference. The method includes determining mentions in the input documents by parsing the input documents. Each mention includes a first vector and a second vector, the first vector for spelling data and the second vector for context data. The method further includes generating a hierarchical tree data structure by generating several leaf nodes, each leaf node corresponding to a respective mention that is determined. The method further includes computing, for each node, a similarity score based on the first vector and the second vector associated with each node. The method further includes populating the hierarchical tree iteratively until a root node is created. Each iteration includes merging two nodes that have the highest similarity scores, wherein merging two nodes includes creating an entity node at a hierarchical level that is above the two nodes being merged. Further, each iteration includes computing the similarity score for the entity node. The method further includes identifying the nodes with the similarity scores above a predetermined value as entities for which coreference has been performed in the input documents.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Figure 1A:
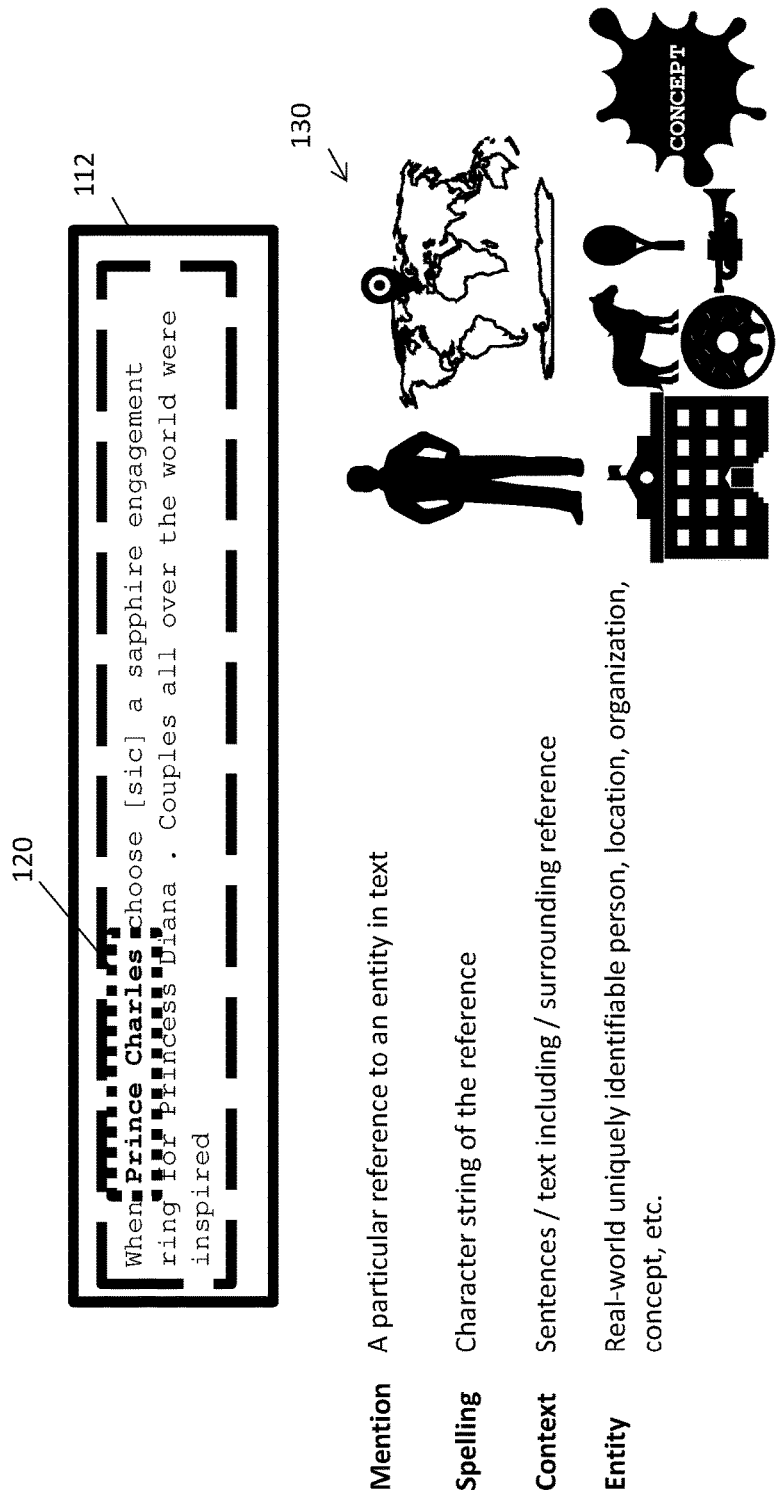
FIG. 1A provides visual depictions of terms that are used in the present document.

The need to identify and extract important concepts in electronic text documents is commonly acknowledged by researchers and practitioners in the fields of information retrieval, knowledge management, natural language processing (NLP), and digital libraries. It is a necessary first step towards achieving a reduction in the ever-increasing volumes of on-line text. FIG. 1A provides visual depictions of terms that are used in the present document. A "mention" 120 is a particular reference to an "entity" 130 in text 112. The "entity" 130 is a real-world uniquely identifiable person, location, organization, concept, etc. A "spelling" is the character string of the reference, i.e. characters representing the mention 120, and a "context" is one or more sentences/text that includes/surrounds the reference in the text 112. The text 112 can be extracted from a document 110.

In current NLP technology, object coreference is typically used to analyze character coreference ((linguistic expressions pertaining to the same entity/event). For example, for a segment of text "Researcher Jane Doe visited the city zoo today . . . Jane talked with curators of the zoo with interest . . . the researcher carefully asked relevant questions . . . ", traditional natural language processing technology can determine that "Jane Doe", "Jane" and "she" refer to a same person (i.e. entity). Existing NLP techniques can further facilitate retrieving a same entity having different names in multiple pieces of article, when the entity being retrieved is known or predetermined, such as in a graph of entities and relationships or a database of records about entities.

However, entities are frequently mentioned ambiguously in natural language corpora. For example, a mention of Matthew may refer any number of people with that surname or given name (e.g., broadcaster B. Matthew and actor Matthew B) as well as other entities such as a book titled Adventures of Matthew or a storm that may be named Hurricane Matthew. Similarly, an entity may be referred to by many different surface forms (e.g., Adventures of Matthew, Adventures according to St. Matthew, etc.). In another example, John F. K may also be referred to as "Jack" and "JFK" and "JFK" may also be used to refer to the airport in Washington D.C. Deciphering such ambiguities automatically using machine learning is a technical challenge.

Further, in various machine learning systems, the extraction of entities from the corpus is used to build an entity-relationship model that is then used for further analysis and automatic decision making by artificial intelligence systems. For example, NLP is useful to process electronic health records (EHRs). However, poor performance in relation detection tasks, such as coreference can affect the quality of EHR processing. Hence, there is a need to advance relation detection from EHRs. Many clinical coreference resolution systems are based on either supervised machine learning or rule-based methods. The need for manually annotated corpus hampers the use of such system in large scale.

For example, if a robust entity deciphering exists, that in turn leads to a robust entity-relationship model, artificial intelligence or cognitive computing may be used to facilitate dynamic clinical decision support. Multiple challenges may exist in clinical decision support, cohort identification, or patient risk prediction and analysis. Supervised models, such as pairwise classification, both strongly depend on annotated corpus which includes less portability and may include difficult to catch global information which can lead to an uninformed decision. Rule based deterministic systems, like the multi-pass sieve require well-crafted features or rule generations. Unsupervised models, like, pure Bayesian framework includes randomness which reduces the result consistency and mostly rely on co-occurrences.

It should be noted that the above example of using NLP in an EHR analysis setting is just one of various other examples where NLP is used in conjunction with cognitive computing. Accordingly, downstream computer applications operating on the deciphered entities from the corpus demand that the ambiguity in the mentions of the entities across the corpus be resolved. In automatic knowledge base construction, relationships are often extracted from natural language text containing mentions of the entities involved. Without determining which mentions refer to the same entity, determine what relationships are known about the entities in the corpus is technically challenging. Additionally, in web search, users often make ambiguous queries. Rather than displaying results referring to a number of different entities that could be referred to by the query, a more efficient browsing experience can be to group results by the entity to which they refer. Determining which mentions in a corpus (one or more documents) refer to the same entity is the technical challenge that is typically referred to as "cross-document coreference".

Cross-document coreference is a clustering problem in which given a collection of documents containing entity mentions M={m1, m2, . . . , mN}, a cross-document coreference system predicts a partition of the mentions into entities E={e1, e2, ..., ek}, where each entity e is referred to as a "predicted entity". Each predicted entity is a set of mentions ei={mj, ..., m_{j+|e_i|−1}}. The set of predicted entities is a clustering; the entities are disjoint and all mentions are assigned some entity.

Figure 1B:
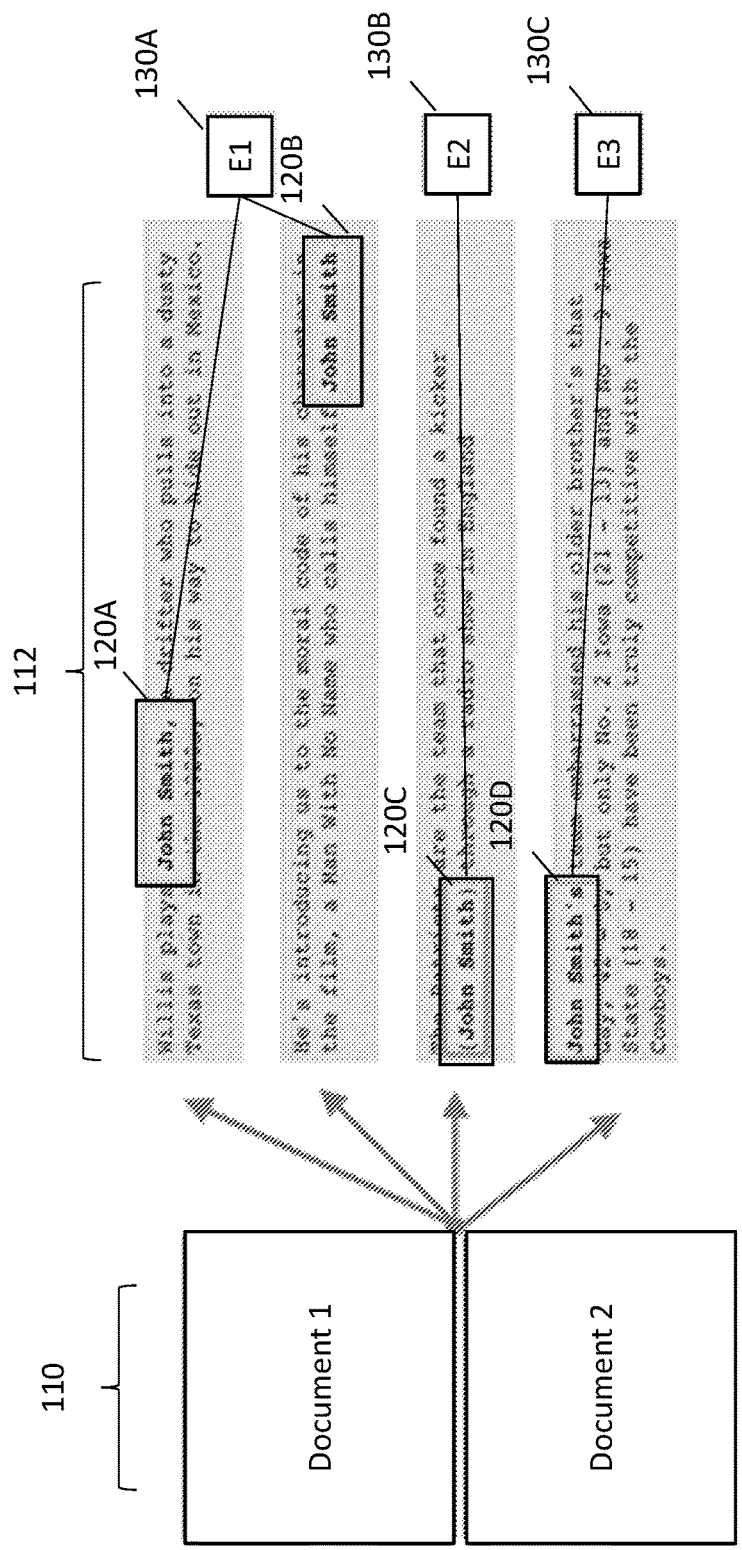
FIG. 1B depicts an example scenario of cross-document coreference according to one or more embodiments of the present invention.

FIG. 1B depicts an example detection of entities in a corpus according to one or more embodiments of the present invention. In the depicted example, documents 110 are parsed to determine extracted passages 112. Cross-document coreference systems have to cluster the ambiguous entity mentions 120 such that each cluster corresponds to an entity 130 in the corpus. In this task, the entities present in the corpora are not known a priori, but instead are determined from the corpus by the cross-document coreference system. Typically, existing systems perform entity classification by deriving a classification and/or clustering that will separate data into categories, or classes, characterized by a distinct set of features. To achieve this, extracted mentions are assigned a metric based on the likeness of their meaning or semantic content to a pre-determined entity. Thus, the entities are known apriority and then identified in the document, but aliases or variants of the entity are found without the aliases or variant mentions being pre-enumerated. In embodiments of the present invention, such apriority knowledge of entities is not available. In the depicted example, mentions 120A and 120B are coreferent and represent entity E1 130A; while, the mentions 120C and 120D are not coreferent, and represent independent entities E2 130B and E3 130C respectively.

Existing techniques for cross-document coreference typically include two components: (1) an entity model, which describes how likely a set of mentions are to refer to the same entity and (2) a clustering algorithm, which given an entity model searches through the possible ways to cluster the mentions for a high scoring partition according to the model. In other words, in order to perform the clustering, cross-document coreference systems typically employ a model that can be used to determine whether two sets of mentions are coreferent, i.e., whether they refer to the same ground-truth entity. For example, similarity between two groups of mentions can be calculated from all pairwise mention compatibilities.

However, such pairwise models are limited compared to richer alternatives that capture entity-level information, aggregated and scored from a set of mentions collectively. Further, in existing systems, parameter-free, aggregation functions of the mentions are used; most often entity representations are modeled as the union of their mentions' bag-of-word contexts. However, not all mentions of an entity carry useful features that should be included when building an entity representation. In some situations, mentions may be noisy or contain spurious features that lead to suboptimal aggregations. Additionally, the features of mentions themselves do not carry equal salience. For example, in determining coreference decisions about whether two mentions of the war refer to the same entity, context features like the years and parties involved are informative while contexts describing fictional books or films about the war or general sentiments may not be informative (and rely on other features for coreference decisions).

Embodiments of the present invention address such technical problems in NLP and facilitate improving cross-document coreference by modeling clusters of mentions as entities. Embodiments of the present invention also facilitate machine learning to agglomerate entity representations for cross-document coreference. Embodiments of the present invention implement technical solutions to learn parameterized aggregation functions for constructing entity representations from their corresponding mentions. As opposed to the parameter free alternatives, parametric aggregation functions facilitate to selectively determine which mentions (or components thereof) are most salient and weight them more significantly during aggregation. As such, parametric aggregators can filter noise that can pervade representations produced by parameter-free models as described herein.

As described in detail herein, in one or more embodiments of the present invention, "mentions" (phrases/words) in the documents that are analyzed are represented as vectors in a low-dimensional embedding space. Here, "embedding" refers to a set of language modeling and feature learning techniques in natural language processing (NLP) where words or phrases from the vocabulary are mapped to vectors of real numbers. Conceptually embedding provides a mathematical embedding from a space with many dimensions per word to a continuous vector space with a relatively lower dimension. Accordingly, the embedding space is the multi-dimension space and the vectors in the space are used for the similarity computations. Similarity between the words or phrases can then be computed as a vector operation in the vector, such as taking the cosine between the two vectors.

Further, "entities" (person/subject/concept being identified) are represented as the vector output of a parametric aggregation function that use the mentions as input. The mention representations are based on learned or pre-trained embeddings of the spelling of the mention surface form and a context of the mention. In one or more embodiments of the present invention, aggregation functions use a parametric attention mechanism closely related to multi-instance learning model. The attention-based aggregation function assigns a weight to each mention representation for use in a weighted average, thereby achieving a desired noise-filtering capability.

Further, to use the learned entity representations in a clustering model for cross-document coreference, one or more embodiments of the present invention use a hierarchical entity model, which constructs a tree structured clustering of the mentions. The mentions are represented at the leaves of the hierarchy. Predicted entities correspond to internal nodes. Each node in the hierarchy stores a representation of its descendant leaf mentions using the learned aggregation function. This hierarchical model allows for intermediate, sub-entity, representations to be built, facilitating more effective inference.

In one or more embodiments of the present invention, a supervised setting is used in which a ground truth clustering of entity mentions is provided to a machine learning system at training time. At test time, new entity mentions are seen and these mentions refer to entities that were absent from the training set. A best-first agglomerative clustering is used for inference at both training and test time. The training procedure updates all components of a machine learning model in an end-to-end manner with a loss based on decisions of the inference procedure. The inference procedure's agglomeration action space is approximated with a nearest neighbor structure, the navigable small world. It is understood that other clustering techniques can be used in other embodiments of the present invention. Experimental results have indicated that embodiments of the present invention outperform existing approaches to cross-document coreference when tested on at least two benchmark datasets.

Figure 2:
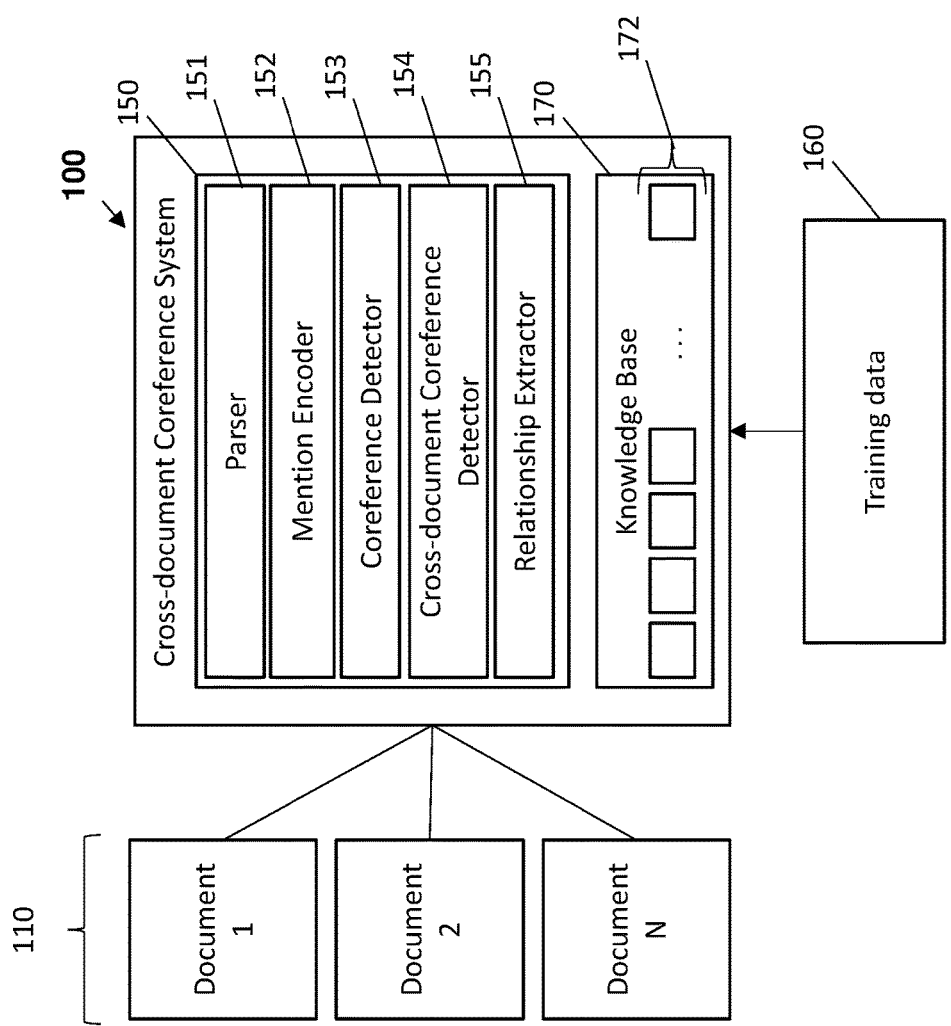
FIG. 2 depicts a block diagram of a cross-document coreference system according to one or more embodiments of the present invention.

FIG. 2 depicts a block diagram of a cross-document coreference system 100 (system) according to one or more embodiments of the present invention. The system 100 includes multiple components that facilitate operating an information extraction pipeline 150. The system 100 receives multiple (N) documents 110 as input. Each document 110 is analyzed by the information extraction pipeline 150.

The documents 110 can be in any language, and in one or more embodiments of the present invention, are translated into a predetermined language, such as English, prior to being analyzed. The documents 110 include textual information. In one or more examples, a crawler (not shown) periodically downloads documents from predetermined locations in a computer network, for example, the Internet, an intranet, etc. Alternatively, or in addition, the documents 110 can be input to the system 100 by a user (not shown).

In one or more embodiments of the present invention, the documents 110 can be input to train the system 100 using a machine learning algorithm. During the training, the system 100 also receives training data 160. The training data 160 includes ground truth results that the system 100 is trained to achieve using a machine learning algorithm, for example, supervised learning, unsupervised learning, reinforcement learning, and the like. The machine learning algorithms can include neural network training, linear regression, classification and regression trees, and the like. The ground truth in the training data 160, in one or more examples, includes entities that are present in the documents 110 that are input as training documents. Further, the training data 160 can include a relationship model between the entities. Alternatively, or in addition, the training data can include a hierarchical tree structure that identifies the entities in the training documents. For example, the training data 160 can include annotated documents that facilitate training the machine learning model of the system 100. Once the system 100 is trained, the system 100 analyzes the documents 110 and outputs entity model automatically based on the training.

The information extraction pipeline includes a parser 151 that parses the words and phrases in the input documents 110. The parsing is followed by mention detection 152. Within each document 110, mentions are clustered by a within-document coreference-resolution algorithm 153. Accordingly, in the appropriate context, "JFK" and "Kennedy Airport" are grouped/clustered under the same entity (the airport at Washington D.C.), and "John F. Kennedy" and "JFK" under the same person (President Kennedy). Nominal and pronominal mentions are also added to the clusters.

Further, performing cross-document coreference links the entity clusters across different (multiple) documents 110. In one or more embodiments of the present invention, performing the multi-document coreference includes linking each cluster from the separate documents 110 to a knowledge base (KB) 170 that is shared across the multiple documents 110. For example, the KB 170 includes one or more entities 172 that are identified previously. Each entity 172 is assigned a unique KB identifier. When a cluster is identified in the documents 110 being analyzed, if a matching entity in the KB 170 is found, the cluster is assigned the KB ID of the match, which allows for the cross-referencing of entities across documents 110. Besides exact match with titles in the KB 170, the cross-document coreference 154 uses soft match features and context information to match against spelling variations and alternate names. The system also disambiguates between entities with identical names.

It should be noted that Cross-document coreference is related to, but distinct from both, within-document coreference and entity linking. Inductive biases regarding the order in which mentions appear are critical for performing within-document coreference, but are not applicable across documents 110 in a corpus. Instances of cross-document coreference typically involve orders of magnitude more mentions than within-document problems as well. Further, unlike entity linking, in cross-document coreference 154, the set of ground-truth entities is unknown in advance and must instead be discovered at real time.

The information extraction pipeline 150 further includes a relationship extractor to 155 determine relations between the entities in the documents 110, such as employed by, son of, president of, etc. The mention detection 152, coreference and relation extraction modules 153, 154, 155 are trained on an annotated set of documents from the training data 160 as described herein.

The system 100 outputs the entity model in one or more embodiments of the present invention. Alternatively, or in addition, the system 100 outputs the set of entities that are deciphered from the documents 110. The output can be displayed via a user interface. Alternatively, or in addition, the output is provided to further components in a cognitive computing system that uses the entities and/or the entity-relationship model to further analyze the documents 110.

Existing cross-document coreference techniques provide, as output, an entity model that is a union of bag of words, i.e. the entities are previously known. Further, in existing techniques, extracted entities are compared by applying various features to pair of entities. Such features can be lexical, syntactic, or semantic. A lexical approach is a union of a bag of words or phrases associated with a known entity. Embodiments of the present invention improve upon such existing techniques and provide entity models that are dynamically learned from the data in the documents 110, i.e., the entities are automatically and dynamically identified from the documents. Further, existing techniques provide, in the entity model, a flat structure of entities. Embodiments of the present invention provide a hierarchical structure of the entity model that makes inference more efficient for the further modules in the cognitive computation system that uses the output from the system 100.

Figure 3:
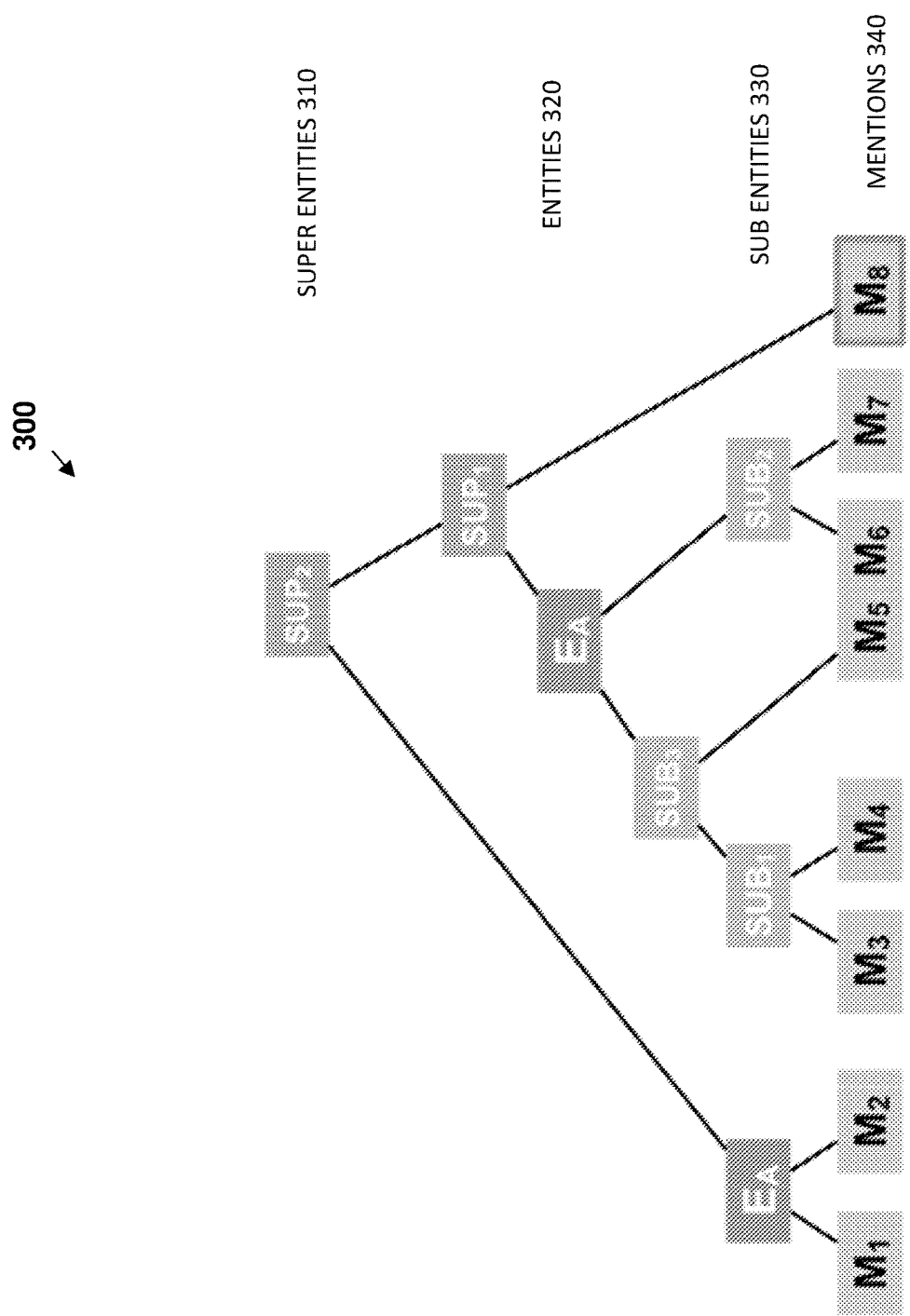
FIG. 3 depicts a hierarchical entity model according to one or more embodiments of the present invention.

FIG. 3 depicts a hierarchical entity model 300 according to one or more embodiments of the present invention. The hierarchical model 300 is of the predicted entities 320. The model 300 simultaneously encodes multiple alternative tree-consistent partitions of the detected mentions 340. In the model 300, the mentions 340 are stored at the leaves of a tree data structure. Each node in the tree data structure is either a predicted entity 340, a sub-entity 330, or a super-entity 310. A sub-entity 330 represents a group of coreferent mentions 340. The closer a sub-entity 330 is to the leaves of the tree, the more similar its descendent mentions 340 are to one another. The super-entities 310 represent collections of predicted entities 320 that are similar to one another. Both the sub-entities 340 and the super-entities 310 help to support coreference decisions with respect to groups of mentions 340 rather than single mentions 340 only.

A tree data structure, T, representing the hierarchical model 300, is scored via an function that computes similarity between two or more mentions. The score of a tree, in one or more embodiments of the present invention, is the sum of the affinities of its non-leaf nodes, which can be expressed as:

$$E(T)=\Sigma_{n\in T\setminus T.leaves}\psi(n.\text{left},n.\text{right}) \qquad (1)$$

Here, n represents a node in the tree, n.left and n.right, are the nodes that are the left and right children of the node n, respectively. The function $\psi$ represents the affinity of the arguments of the function. In one or more embodiments of the present invention, instead of using k-array trees as was the case in existing techniques, the cross-document coreference system 100 uses binary trees. The binary trees facilitate representing a larger number of tree-consistent partitions. Further, in one or more embodiments of the present invention, the cross-document coreference system 100 uses a single entity-bias value for determining the entity nodes (320) in the tree rather than different thresholds. This bias is selected using the development set and applied only at the end of inference to select predicted entities 320 from the tree. The goal of inference is to construct the tree, T, with the highest overall affinity score.

Further yet, in existing techniques, the function $\psi$ operates on one of two kinds of representations of nodes in the hierarchical model 300. In the first setting, $\psi$ operates on an aggregation of the features of a node's entity mentions. For example, $\psi$ is the average of all of the feature vectors of the mentions 340 or the union of bag-of-word style features. In the second setting, $\psi$ operates on entire sets of mention vectors. For example, all descendant mentions of n.left are compared to mentions of n.right and the average similarity is used for $\psi$. However, both of these settings can cause technical challenges and are not desirable. The former is subject to noise and risks losing meaning over large sets of mentions 340. The latter is computationally intensive and cannot facilitate pooling information from multiple mentions 340.

To address such technical challenges, in one or more embodiments of the present invention, the cross-document coreference system 100 undergoes "learning" to agglomerate representations of mentions 340 to form representations of entities 320. The learning generates parametric models for combining the representations of the mentions 340 so as to adaptively select mentions 340 for an entity representation.

Figure 4:
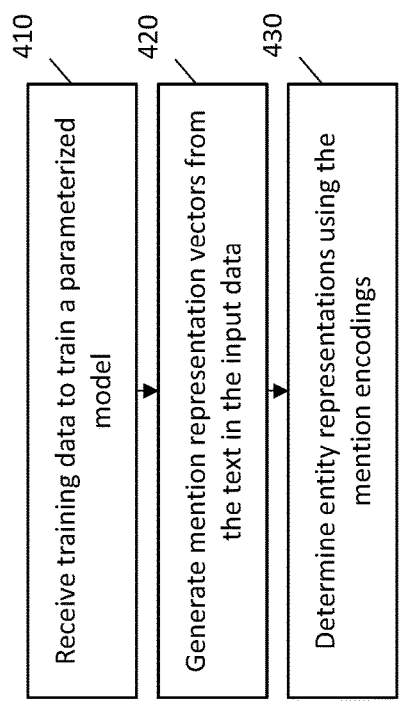
FIG. 4 depicts a flowchart of a method for cross-document coreference according to one or more embodiments of the present invention.

FIG. 4 depicts a flowchart of a method 400 for cross-document coreference according to one or more embodiments of the present invention. The method 400 includes receiving the training data 170, at block 410. The training data 170 includes annotated documents 110 that indicate the entities to be deciphered. The method 400 includes parsing the documents 110 to identify mention representations 340 in the documents 110, at block 420. As described earlier (FIG. 3), the mention representations 340 are the building blocks of the entity representations 320 (as well as super-entities 310, and sub-entities 330).

Figure 5:
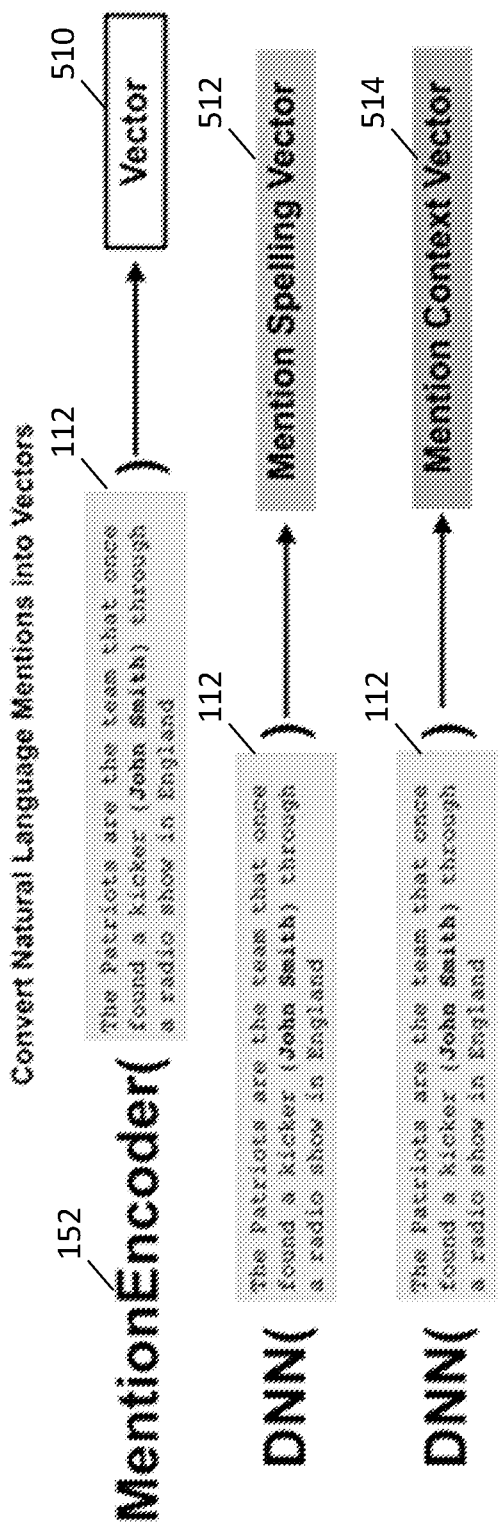
FIG. 5 depicts examples of mention representations according to one or more embodiments of the present invention.

FIG. 5 depicts examples of mention representations according to one or more embodiments of the present invention. The mention encoder 150 analyzes the parsed/extracted text 112 from one of the input documents 110 and generates a vector 510 of one or more mentions 340 in the text 112. In one or more examples, the mention encoder 152 includes two artificial neural networks, a spelling DNN 522 and a context DNN 524, for example, deep neural networks (DNN) that facilitate determining the mention representations 340 in the text 112. The DNNs 522, 524 are trained using the training data 170 to identify the mention representations 340. Training the DNNs 522, 524 can be performed using any DNN training techniques. Training the DNNs 522, 524 include adjusting the weights and/or hyper parameters of the DNNs 522, 524 so that the mention representation vectors 510 includes estimates that match the predetermined results provided in the training data 170.

The mention encoder 152 takes a natural language vector (i.e. text 112) and produces a low dimensional vector representation 510 of the mention 340. For example, Singular Value Decomposition (SVD) is a method that takes a large vector space (e.g., the number of unique words or phrases in a document) and reduces it to a smaller vector space (e.g., usually fixed dimension such as 80 or 100). The smaller vector space (embedding space) captures the similarity between the words and phrases. In one or more examples, the mention representation vector 510 includes two vectors, a spelling vector 512 and a context vector 514. The spelling vector 512 includes different surface forms of the mentions 240, because entities 320 can be referred by a wide variety of aliases. In one or more embodiments of the present invention, a mention vector represents a single mention, and may not include variant spellings; rather, it represents the spelling in a way that variant spellings have similar vectors. It is understood that this is an example and in one or more embodiments of the present invention the spelling vector 512 can be different.

Context vector 514 possesses type characteristics of the corresponding entity as well as indicators such as co-occurring mentions. In one or more embodiments of the present invention, a context vector for a single mention represents the particular context of that mention, and further represents the context in a way that similar contexts have similar vectors. The 'entity' context vector that encodes all the different contexts.

Figure 6:
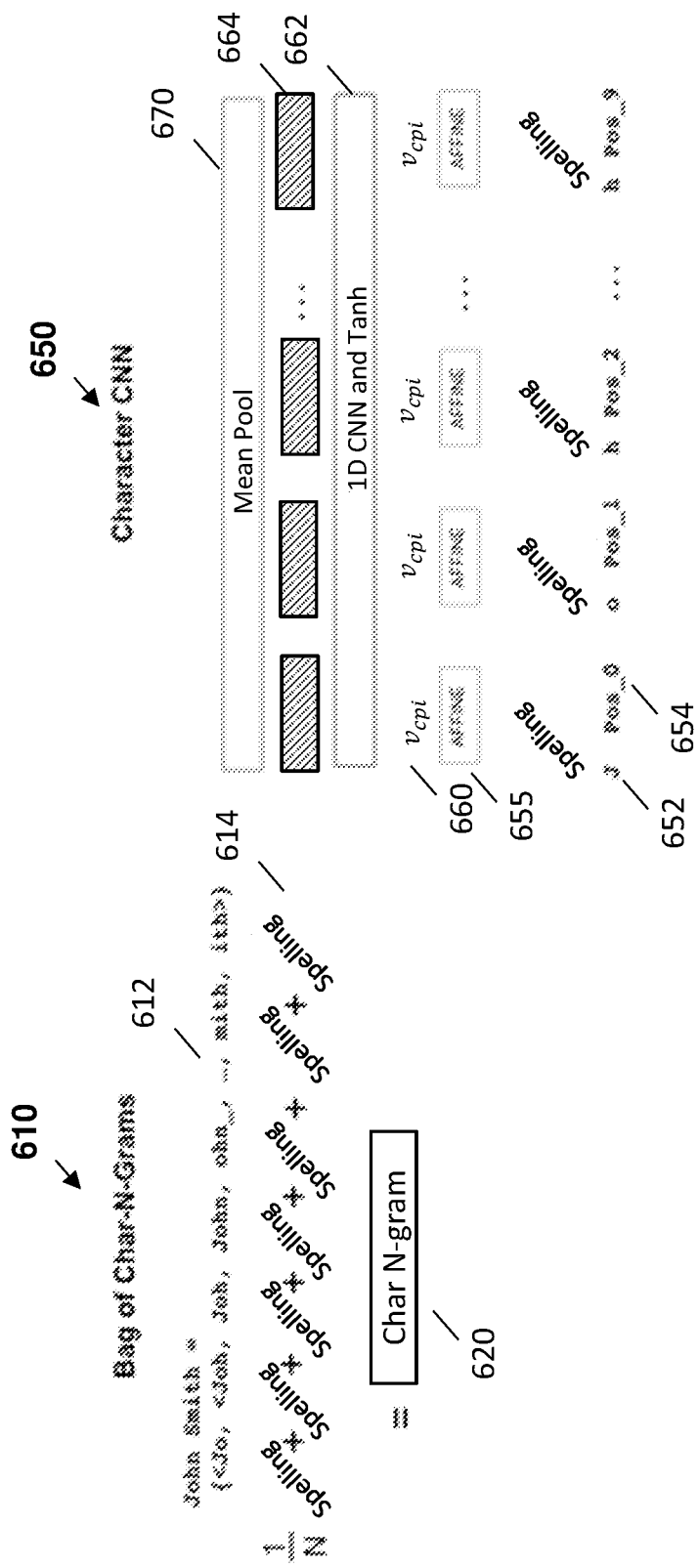
FIG. 6 depicts a visual representation of surface form encoders used by a mention encoder according to one or more embodiments of the present invention.

FIG. 6 depicts a visual representation of surface form encoders used by the mention encoder 152 according to one or more embodiments of the present invention.

The spelling vector 512 representing the surface form of the mentions, in one or more embodiments of the present invention, is generated by training the DNN 512 using a Continuous Bag of Character N-grams 610. In this case, subword models 612 are used to encode the surface forms 614. Subword models 612 represent tokens by averaging the embeddings of their character n-grams. For example, the phrase "Ann Arbor" can be represented by the averaging the embeddings of its character trigrams, i.e., sw(Ann Arbor)={<An, Ann, nn_, n_A, _Ar, . . . , or>}. Such averaging for character embedding aggregation can capture spelling similarity between words and phrases. The mention encoder 152 is trained to provide an averaged representation 620, $v_{phr}$, of the mentions using such n-grams, where n can be {2, 3, 4, 5, 6}. The averaged representation is used by the affinity score function $\psi$.

Alternatively, or in addition, in one or more embodiments of the present invention, the mention encoder 152 also uses a character convolutional neural network (CNN) 650 to model string similarity. For example, the DNN is the character CNN 650 with position embeddings. In this case, for a surface form, s, with characters $c_0, \ldots, c_l$, each character's embedding 652, $v_{ci}$, is combined with a corresponding position embedding vector 654, $v_{pi}$ for its position in the string with an affine transformation 655. The resulting vectors 660 $v_{cpi}$ are the input to a 1-D CNN 662. A nonlinearity is applied to the resulting states 664 from the 1-D CNN 662 and average pooling 670 is applied, resulting in:

$$v_{cpi} = W_{cp}^T(v_{ci} \oplus v_{pi}) \qquad (2)$$

$$v'_{cpi} = \text{Tanh}\left(W_{sfcnn}^T\left(\bigoplus_{k=0}^{r} v_{cpi\pm k}\right)\right) \qquad (3)$$

$$v_{sfcnn} = \frac{1}{l}\sum_{i=0}^{l} v'_{cpi} \qquad (4)$$

In above equations, r is the number of filters and $\oplus$ is the concatenation operator. The resulting representation for the sequence $v_{sfcnn}$ is used in the overall scoring model $\psi$. In one or more embodiments of the present invention, filters are vectors, so that a dot product of the filter-vector and the concatenated representations of the char-n-grams can be computed. $\psi$ gives the score for an individual non-leaf node. The score for the entire tree is the sum of these scores.

Further, the mention encoder 152 uses, for generating the context vector 514, a CNN to model natural language for entity type prediction, entity linking, and relation extraction.

Figure 7:
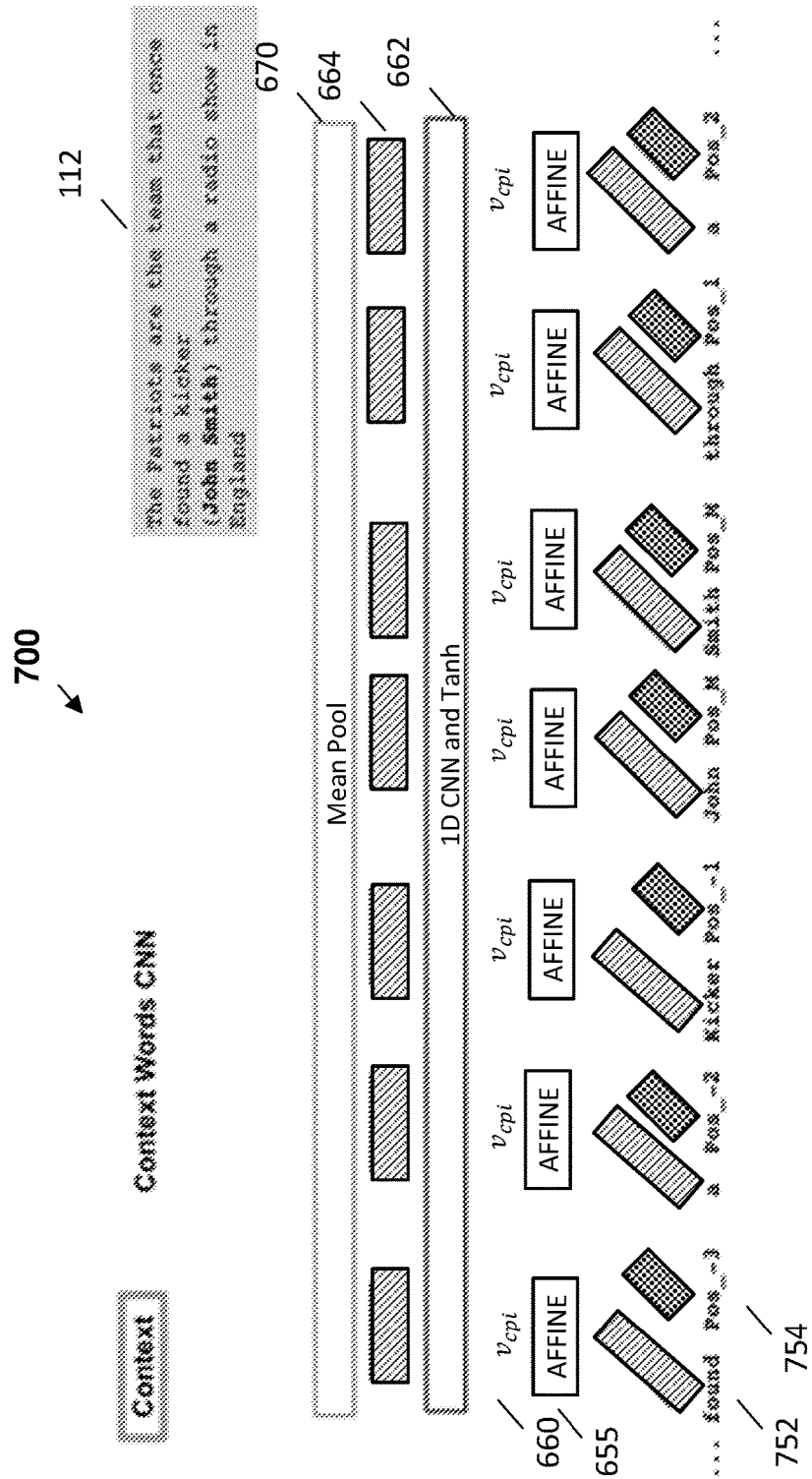
FIG. 7 depicts a visual representation of context form encoders used by the mention encoder according to one or more embodiments of the present invention.

FIG. 7 depicts a visual representation of context form encoder used by the mention encoder 152 according to one or more embodiments of the present invention. The architecture of a context CNN 700 follows that of the CNN 650 used for determining the spelling vector 512. However, the context CNN 700 operates using tokens rather than at the character level (as was the case for the spelling CNN 650). Here, the tokens 752 are the words in the extracted text 112 and the positions 754 represent the locations of those tokens 752 in the sentence in relation to the mention (in this example, John Smith).

The context form encoder is the CNN 700 that uses position embeddings that are relative to the position of the mention span rather than the start of the sentence in which the mention is detected. Here, each token's embedding 752, $v_{ci}$, is combined with a corresponding position embedding vector 754, $v_{pi}$ for its position in the string with an affine transformation 655. The resulting vectors 660 $v_{cpi}$ are the input to a 1-D CNN 662. A nonlinearity is applied to the resulting states 664 from the 1-D CNN 662 and average pooling 670 is applied.

It should be noted that while using CNNs 650, 750 are described herein for generating the spelling vector 512 and the context vector 514, in other embodiments, the vectors 512, 514 can be generated using other techniques.

Referring again to the flowchart in FIG. 4, the method 400 further includes determining entity representations using the mention encoding vectors, at block 430. Each node in the hierarchical entity model 300 stores its own entity representation, which encodes the node's descendant mentions 340. This representation is then used in computing the overall score of the affinity model. In existing techniques, the entity representation is a parameter-free function (e.g. sum, average, max). As described in detail herein, embodiments of the present invention use a model for learning entity representations using parametric aggregation functions.

Figure 8:
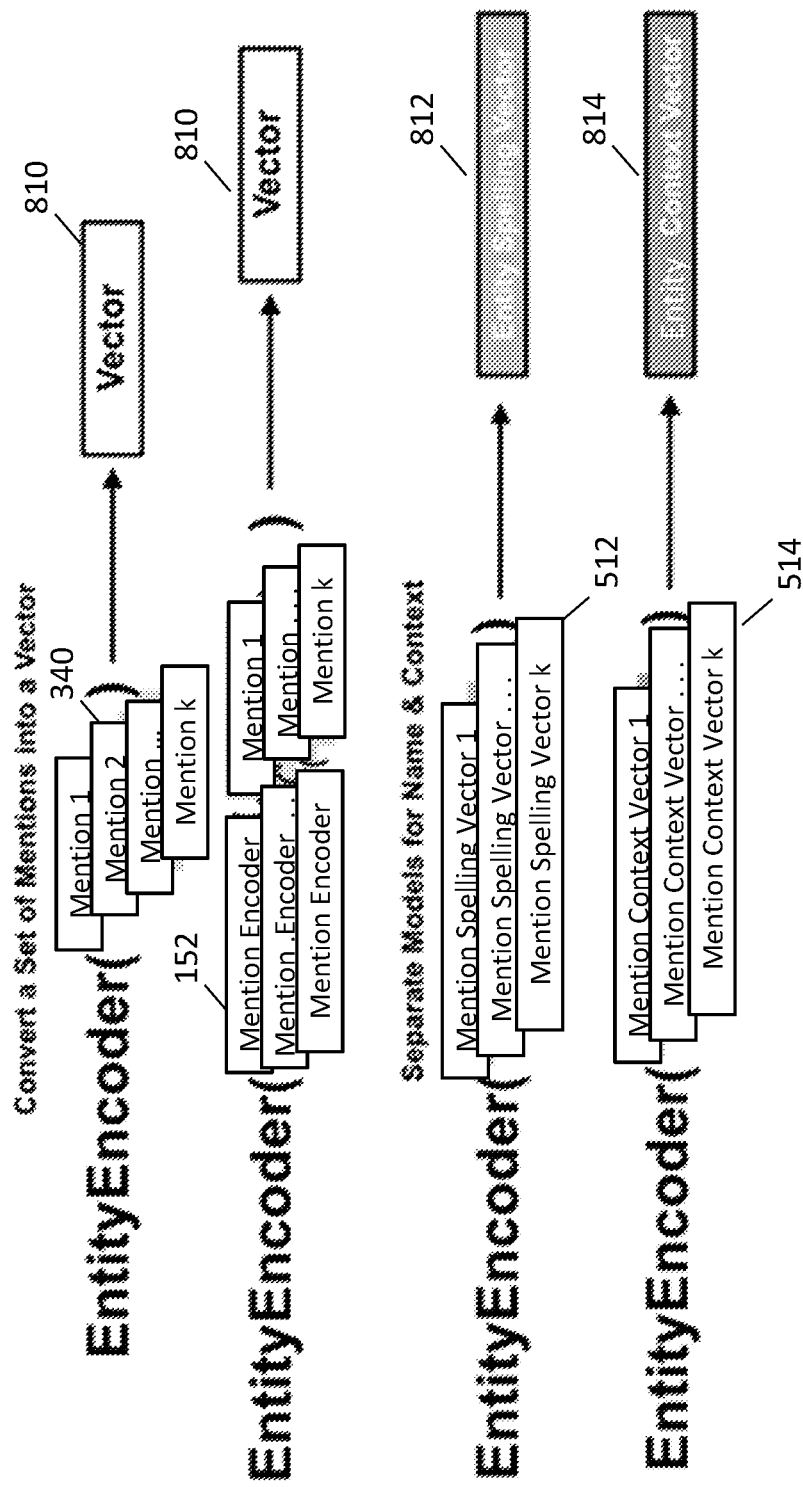
FIG. 8 depicts a visual representation of entity encoding according to one or more embodiments of the present invention.

FIG. 8 depicts a visual representation of entity encoding according to one or more embodiments of the present invention. The coreference detector 153 encodes entities given the set of mention representation vectors 510. The coreference detector 153 produces a single embedding vector 810 for the entity represented by the set of mention representations. The parametric entity models learn from the training data about which kinds of mention representations should be selected for generating corresponding entity representation and how such information should be aggregated. The parametric aggregation function has to accept any number of mentions 340 as inputs and the aggregation function (entity encoder in FIG. 8) has to be invariant to permuting the input order of mentions 340.

Embodiments of the present invention facilitate entity encoding using the hierarchical model 300 using selective and parametric entity encoders based on labeled training data. The entity encoding, in one or more examples, is split into two parts. A first part computes an entity spelling vector 812 using the mention spelling vectors 512. A second part computes an entity context vector 814 using the mention context vectors 514. As described herein, in one or more embodiments of the present invention, the entity spelling and context vectors are representations of all the mention spelling and context vectors. For example, in the above described example scenario, the spelling vector 512 can include, in the case of "John Smith", {John, Smith, John Smith, Mr. Smith, JS, Johnny}. Further, for example, the context vector 514 can include, in the case of "John Smith", {kicker, place kicker, Patriots kicker, New England kicker}.

For several entities, the corresponding mention surface forms 512 and contexts 514 can be uninformative or even misleading. Not every context that an entity appears in can be included in that entity's aggregated representation. Accordingly, in one or more embodiments of the present invention an attention-based approach is used that learns to assign weights to mention representations 510 such that the weighted average of the mention representations 510 produces a meaningful entity representation 810.

Figure 9:
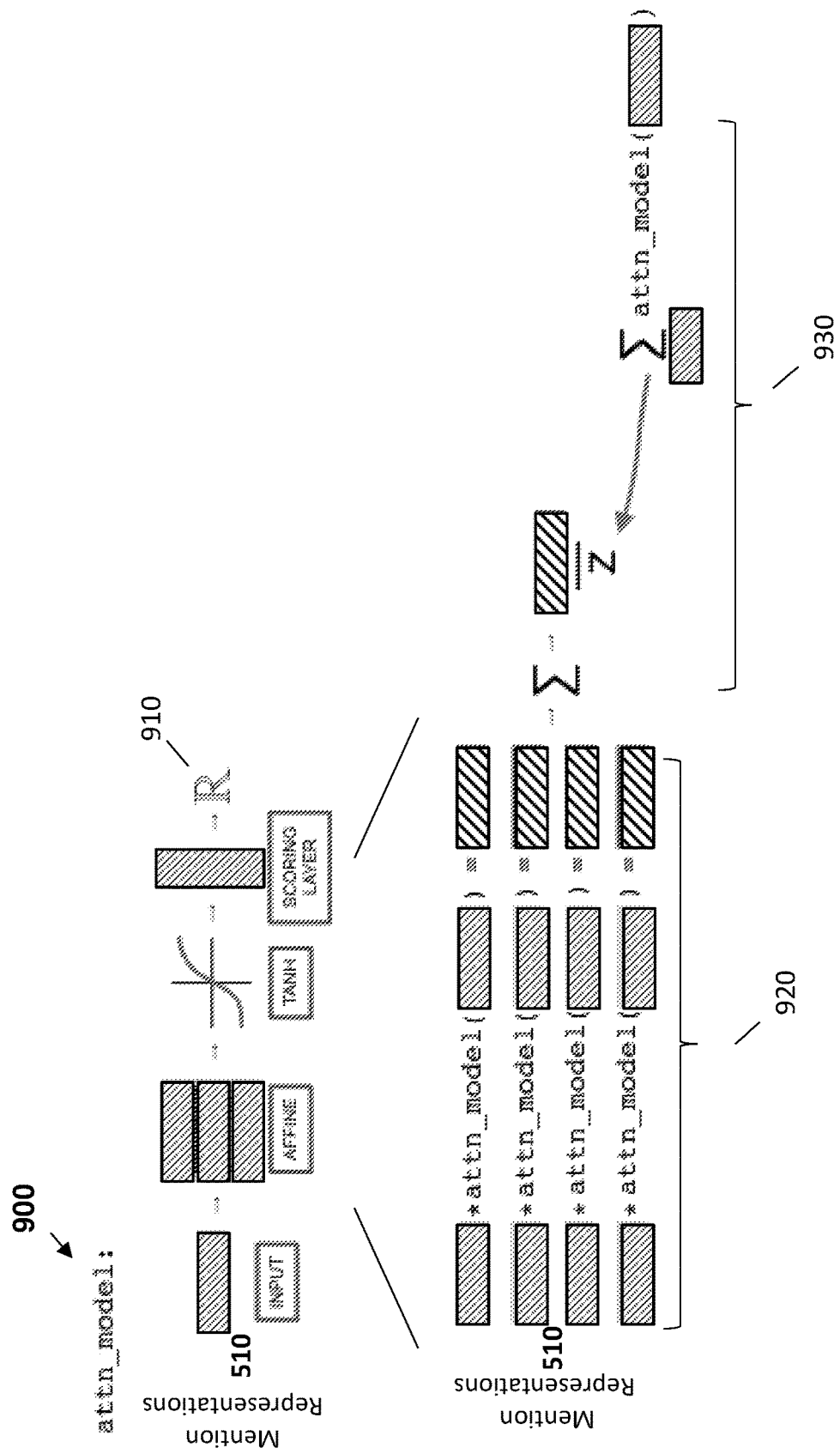
FIG. 9 depicts an attention model according to one or more embodiments of the present invention.

FIG. 9 depicts a attention model 900 according to one or more embodiments of the present invention. The attention model 900 used for calculating the attention ($f_{att}$), in one or more embodiments of the present invention, is an artificial neural network, such as a two-hidden layer multilayer perceptron (MLP). The attention model 900 learns what kinds of mention surface forms 512 and contexts 514 are informative for generating entity representations dynamically at real time. The attention model 900 is used to represent each entity by a single vector (R in FIG. 9) 910 that is the weighted average of its mentions. The weights of the mentions are learned using the attention model 900 that is implemented using/as a neural network.

In one or more embodiments of the present invention, the attention model 900, for computing an attention value ($f_{att}$) takes the encoded mention representations 510 as input and produces a scalar that determines how much a particular mention vector of the mention representations 510 contributes to a weighted average representation of the mentions:

$$n_{att} = \frac{1}{\sum_{m' \in n} f_{att}(v_{m'})} \sum_{m \in n} f_{att}(v_{m'}) \cdot v_m \qquad (5)$$

The architecture of the attention model 900 is permutation invariant for producing vector representations of a set inputs, in this case the mention representations 510. The attention model 900 constructs a Deep Set for a node n by using two neural networks, where a node n is any node in the hierarchical model 300. The first neural network 920 embeds each mention m. The embedded representations are summed and then fed as input to a second neural network 930. Here, the first neural network 920 performs an attention reweighting, and the second neural network 930 performs a normalization. In other words, one or more weights of the first neural network 920 are adjusted according to a difference in the resulting entities estimated by the encoding versus the entities according to the ground truth in the training data 170.

Each node in the hierarchy model 300 stores two vectors: one representing its mention surface form spelling (512) and the other representing its context (514). The function $\psi(:)$ scores two siblings using these two vectors (512, 514) as parameters. Higher scores correspond to higher likelihood that the siblings are coreferent. For each pair of corresponding vectors in the sibling representations, a cosine similarity of its entity representations is computed. The function $\psi(:)$, in one or more embodiments of the present invention, is a linear model with the features of the cosine similarities as well as two binary name-mismatch features (whether they are not an exact match or whether their character n-gram representations have cosine similarity <0:9). The particular entity model and mention representations used in each dataset setting can be varied based on the training data being used and/or other factors based on the user preferences. The selection of the entity and mention models is empirical in one or more embodiments of the present invention. What models work best for a given dataset can be determined by a user by trying alternatives on a development set.

At this point, the method 400 completes training the system 100 about determining entities from mentions using the hierarchical model 300. In other words, the system 100 is trained to generate the hierarchical model 300 from a given input of documents 110, and further, to identify which of the nodes from the hierarchical model 300 are entities (320) based on the aggregation of the mentions 340 in the hierarchical model 300 using the function ψ(:).

Accordingly, the method 400 includes training a machine learning model, for example a neural network, by selecting a number of representative mentions in an entity or sub/super-entity. The selection can be performed by measuring a similarity between entities based on the average/min/max or distribution of similarity scores of the two entity's representatives. For example, cosine similarity, or any other types of similarity function can be used for determining the similarity scores. Further, each entity is represented by a single vector that is the weighted average of its mentions. The weights of the mentions are learned by the neural network. Further, neural networks are used to model sets of data points using a nonlinear projection of points summed together and combined with another non-linear transformation. Rather than computing the model sets over all the mentions as described herein, in one or more embodiments of the present invention, only the select mentions are used, which improves efficiency and reduces computing resources required. The method 400, accordingly, provides a practical application and an improvement to computing by improving the cross-document coreference system 100 in this manner.

Figure 10:
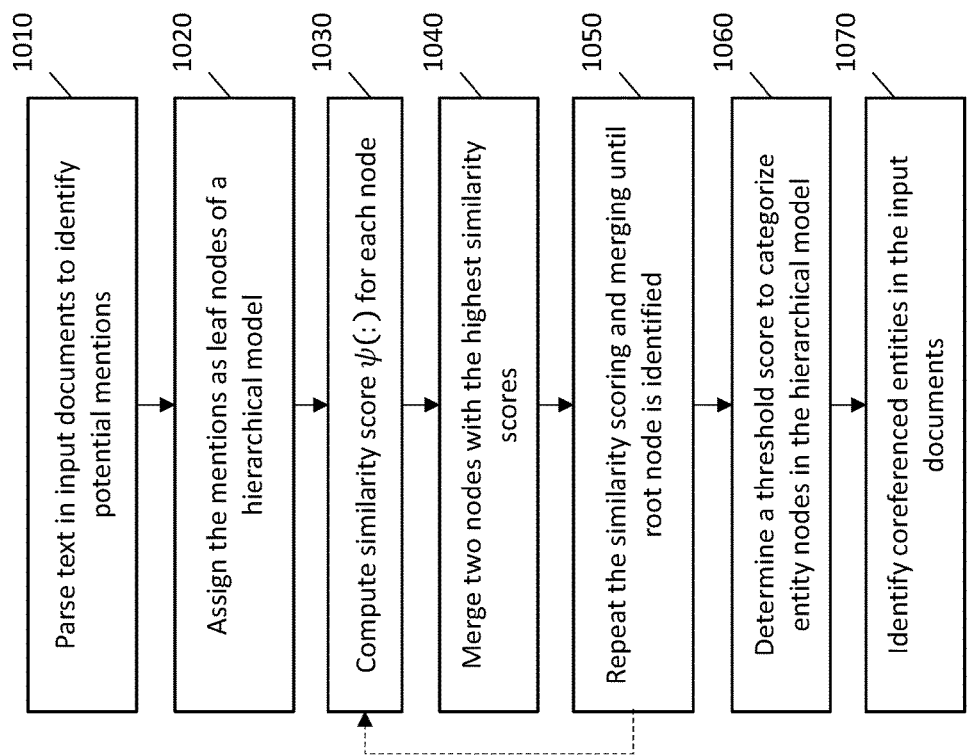
FIG. 10 describes determining entities in one or more input documents at real time using a machine learning model for cross-document coreference according to one or more embodiments of the present invention.
Figure 11:
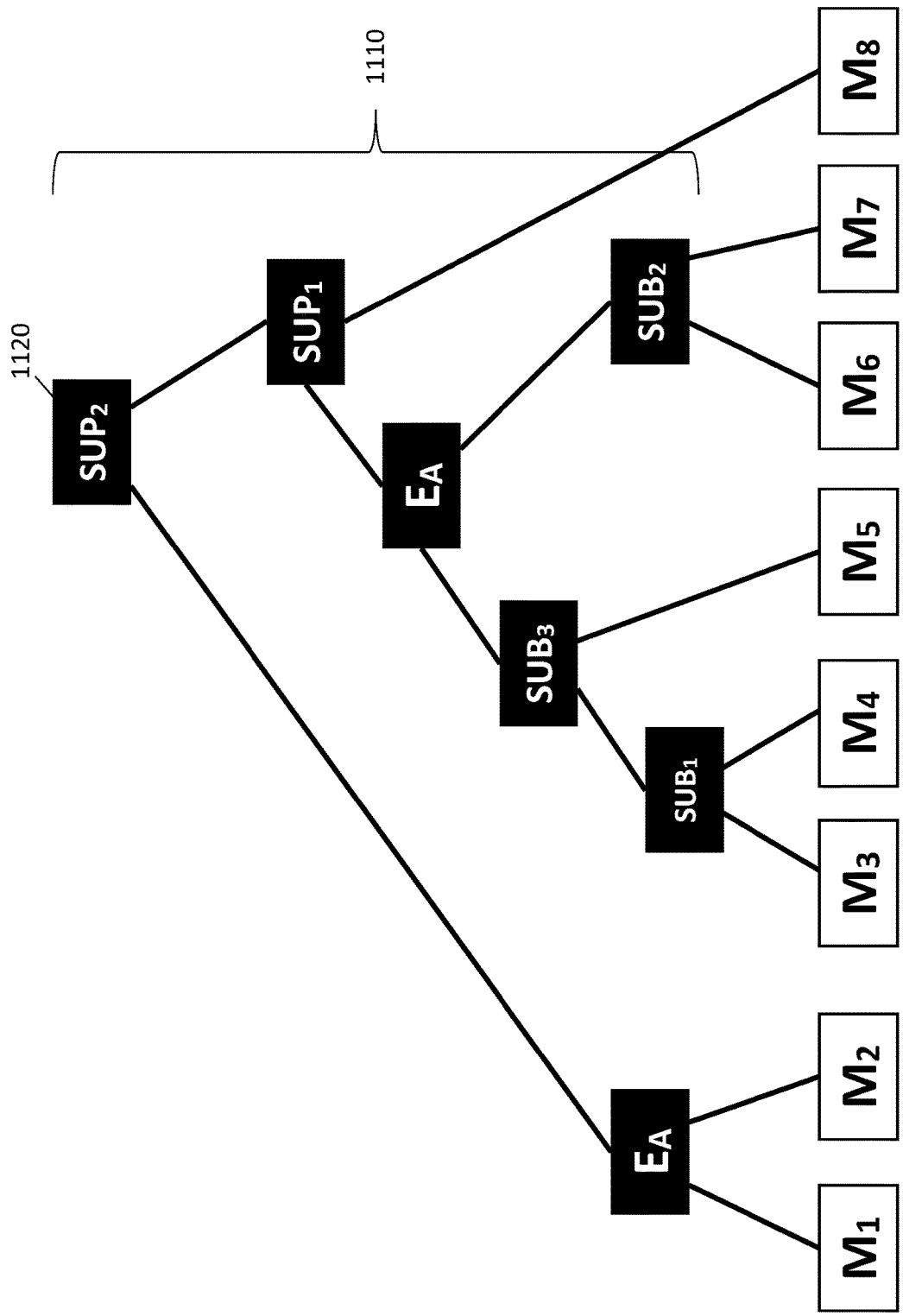
FIG. 11 depicts performing cross-document coreference according to one or more embodiments of the present invention.

FIG. 10 describes using the cross-document coreference system 100 to determine entities in the input documents at real time according to one or more embodiments of the present invention. The flowchart in FIG. 10 depicts a method 1000 for inferring, by the cross-document coreference system 100, using the scoring function to produce a hierarchical tree structure 300 over the mentions in the input documents 110. FIG. 11 depicts an example scenario as the method 1000 is being executed. Entity nodes 720 are predicted by applying a threshold to the function ψ(:) and selecting subtrees using a bottom up procedure, which assigns entity nodes 720 in the hierarchical tree 300 at the deepest node where ψ(:) produces a score below the threshold for a node's parent.

The method includes parsing and determining mentions from the one or more input documents 110, at block 1010. For example, after parsing the documents 110, all the words/phrases that can be mentions of potential entities are identified. FIG. 11 lists such potential entities as M1-M8.

The method 1000 further includes generating the hierarchical model 300 for the identified mentions by using bottom-up agglomerative clustering. The agglomerative clustering includes assigning each of the potential mentions as leaf nodes (370) of the hierarchical model 300, at block 1020. Further, for each of the leaf nodes (370), a similarity score is computed using the similarity function ψ(:), at block 1030. The inputs to the function, for each node (370), include the spelling form vector(s) 512 and the context form vector(s) 514 for the mention (M1-M8) at that node (370).

Further, the two nodes with the highest score (ψ(:)) are merged, at block 1040. "Merging" in this case indicates creating a new node (1110 in FIG. 11) in the hierarchical model 300 that is a parent of the two nodes being merged. In the depicted example of FIGS. 11, M3 and M4 are considered the mentions with the highest two scores. These operations, of selecting the two nodes with the highest similarity scores and merging them is continued until a root node (1120) is created, at block 1040. Once, a new node (1110) is created, a similarity score of that new node 1110 is computed and used in the subsequent steps. The descendant nodes (M3, M4) that were merged to form the new node 1110 are now not considered in the subsequent agglomeration steps. In this process the new nodes 1110 are combined further to form additional new nodes until a single node, i.e. the root node 1120, exists.

A standard implementation of such a repetitive loop can be computationally expensive when the number of mentions is large (thousands, millions). Therefore, in one or more embodiments of the present invention, a best-first algorithm is used by considering a limited number of potential agglomerations in each iteration. To select potential agglomerations, an approximate nearest neighbor data structure called the navigable small world (NSW) is used to quickly determine K potential agglomerations for a given node. Specifically, a NSW is computed for each of the mentions (M1-M8) using the similarity function. The NSW is subsequently queried with each mention, m, to retrieve its top-K approximate nearest neighbors with respect to ψ(m:). The query mention (i.e. m) itself is excluded from the top-K. When the new internal node 1110 is created by an agglomeration, it is added to the NSW and its top-K nearest node neighbors are cached. This results in a procedure that has running time $O(K|M| \log K|M|)$, where K is a predetermined value and M is the number of mentions.

Further, the method 1000 includes identifying which nodes represent entities from the input documents 110, at block 1060. To determine which nodes in the hierarchical entity model 300 refer to entities, a threshold on the similarity score (ψ) is determined using development data. The threshold is a value (t), which divides the hierarchical model 300 at all agglomeration nodes, n, that had a score of ψ(n.left; n.right) <t. In other words, a node n is assigned to be an entity if n satisfies ψ(n.left; n.right)>t and ψ(n; n.sibling)<t and no descendant of n, n' satisfies ψ(n'; n'.sibling)<t. The threshold t can be dynamically selected using development data to be the threshold which selects the highest scoring clustering on the development set.

The iterations to populate the hierarchical model 300 in this manner continues until a root node 310 is identified. For example, a root node is deemed to be identified when all the leaf nodes 370 are linked, directly or indirectly, to a single node, which is the root node 310. In other words, the agglomerative clustering stops when the tree has a root node.

The method 1000 further identifies the entities from the input documents based on the nodes with the similarity scores above the threshold, at block 1070. In one or more examples, the identified entities are marked and presented to one or more users. In one or more embodiments of the present invention, the hierarchical model 300 is displayed in a navigable form to the user. In one or more embodiments of the present invention, the user interface displays the information as a navigable user-interactive tree, for example, with shapes such as circles to represent the nodes and lines for the links from parent to child nodes.

Accordingly, embodiments of the present invention provide techniques for performing automatic cross-document coreference for a corpus of input documents 110. In one or more embodiments of the present invention, the system 100 identifies mentions in the input documents 110 by parsing the input documents 110. Each mention is associated with a first vector and a second vector, the first vector includes spelling data and the second vector includes context data of the mentions. Further, the system 100 generates a hierarchical tree 300 by first generating the leaf nodes 370, each leaf node 370 corresponding to a respective mention that is identified from the input documents 110. The system 100 computes, for each node, a similarity score based on the first vector and the second vector associated with that node. Further, the hierarchical tree 300 is iteratively populated until a root node 310 is created.

In each iteration two nodes that have the highest similarity scores are merged. Merging two nodes results in creating an entity node 1110 at a hierarchical level that is above the two nodes being merged. The entity node 1110 can be a sub-entity, an entity, or a super entity. Further, in each iteration, the similarity score for the entity node 1110 is computed. In one or more embodiments of the present invention, merging two nodes further includes generating a deep set of descendant mentions that are represented by the two nodes being merged. The descendant mentions include the mentions represented by the two nodes and the mentions of the nodes that are descendants of the two nodes in the hierarchical tree. Merging the two nodes to create the entity node 1110, in one or more embodiments of the present invention, is performed by filtering the descendant mentions, and storing a set of filtered mentions as being associated with the entity node 1110. This reduces the computational resources required not only for storing the nodes, but also for using the nodes in further iterations.

In one or more embodiments of the present invention, the set of filtered mentions is determined using an attention neural network as described herein.

Further, merging the two nodes includes using a neural network to encode the descendant mentions into a fixed length vector by transforming the descendant mention into corresponding scalar values using a non-linear transformation and summing the scalar values. Further, the descendant mentions to be encoded are filtered to select a subset of descendant mentions and encoding the selected subset of descendant mentions.

The system 100 can identify, from the populated hierarchical model 300, the nodes with the similarity scores above a predetermined value as entities for which coreference has been performed in the input documents 110.

Accordingly, embodiments of the present invention facilitate receiving a set of mentions labeled with ground-truth entity identifiers. The training procedure optimizes the parameters of the mention representation encoders, entity models, and similarity function. In one or more embodiments of the present invention, an inference driven training procedure is used. The training procedure runs the inference on a subset of data and for each considered agglomeration, the score of the model/ideal/desired is regressed to the pairwise precision of the entity that results from the agglomeration. The pairwise precision is defined as the number of pairs of mentions that are truly coreferently with one another divided by the number of pairs of mentions that are descendants of the node (n).

Further, mention surface form spellings are modeled with various techniques, such as the character-n-gram continuous-bag-of-words model trained on the mentions of the training partition and the learned CNN representation. Mention contexts are modeled using the learned CNN representation. Further, an attention based learned aggregation function is used independently for the mention representations for both learned name spellings and contexts. The resulting aggregated name and context vectors are compared via cosine similarity to those of other entities in the scoring function.

The resulting learned entity model selectively determines salient mentions for entity representations. Based on experiments performed, it is noted that embodiments of the present invention provide an improvement over existing techniques such as the pairwise model, and the baseline, which use pre-trained named features.

Figure 12:
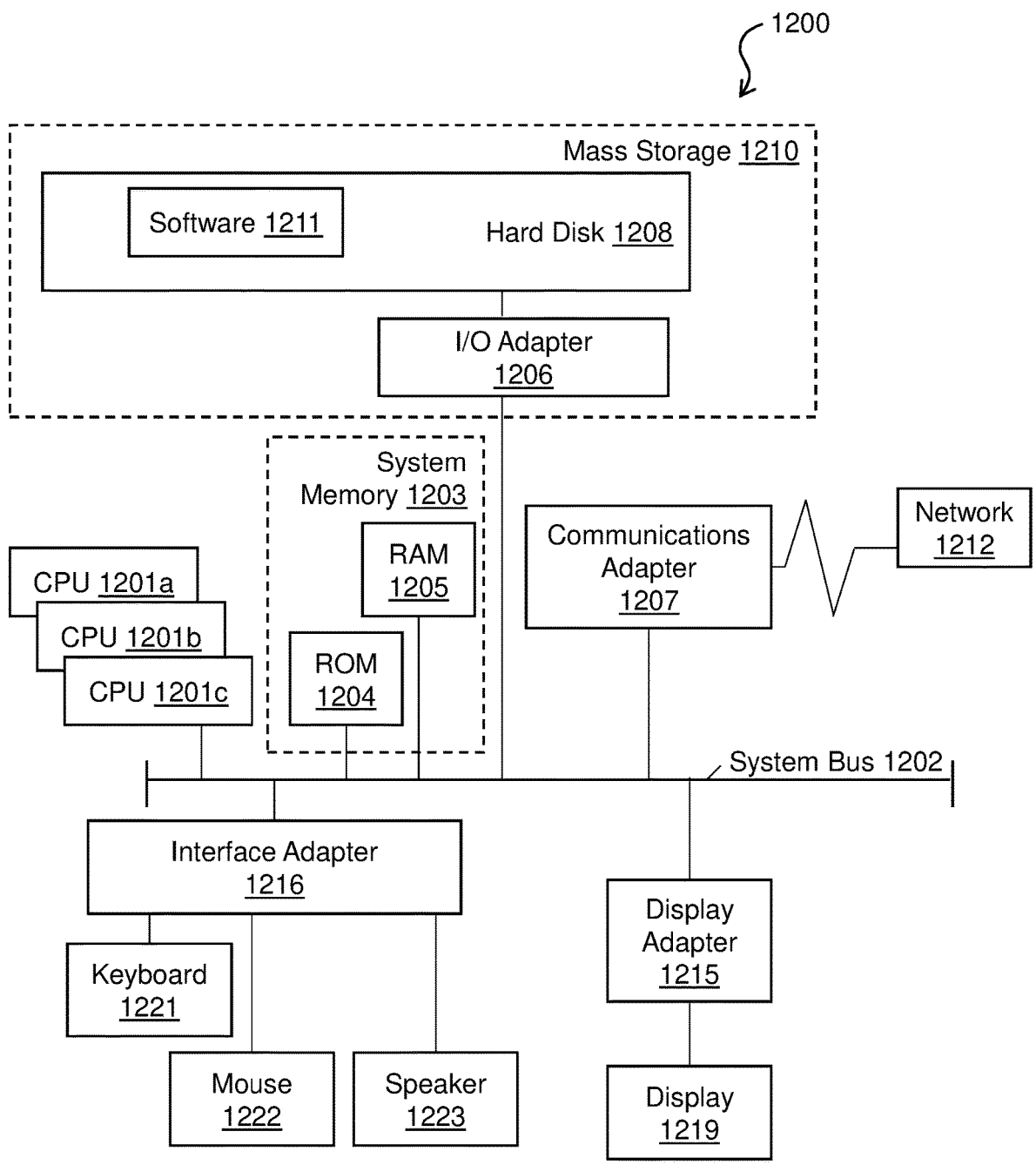
FIG. 12 depicts a computer system according to one or more embodiments of the present invention.
Figure 13:
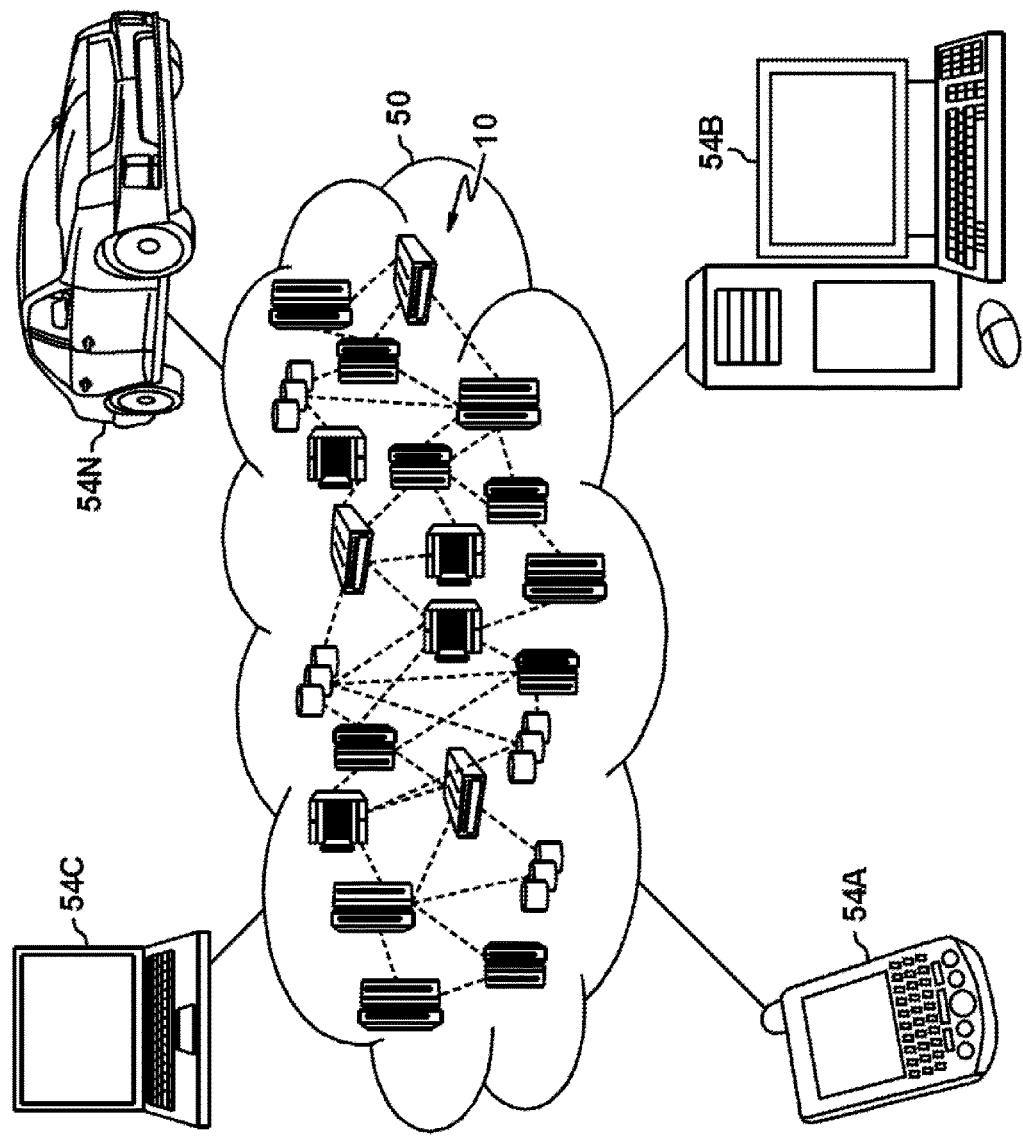
FIG. 13 depicts a cloud computing platform according to one or more embodiments of the present invention.
Figure 14:
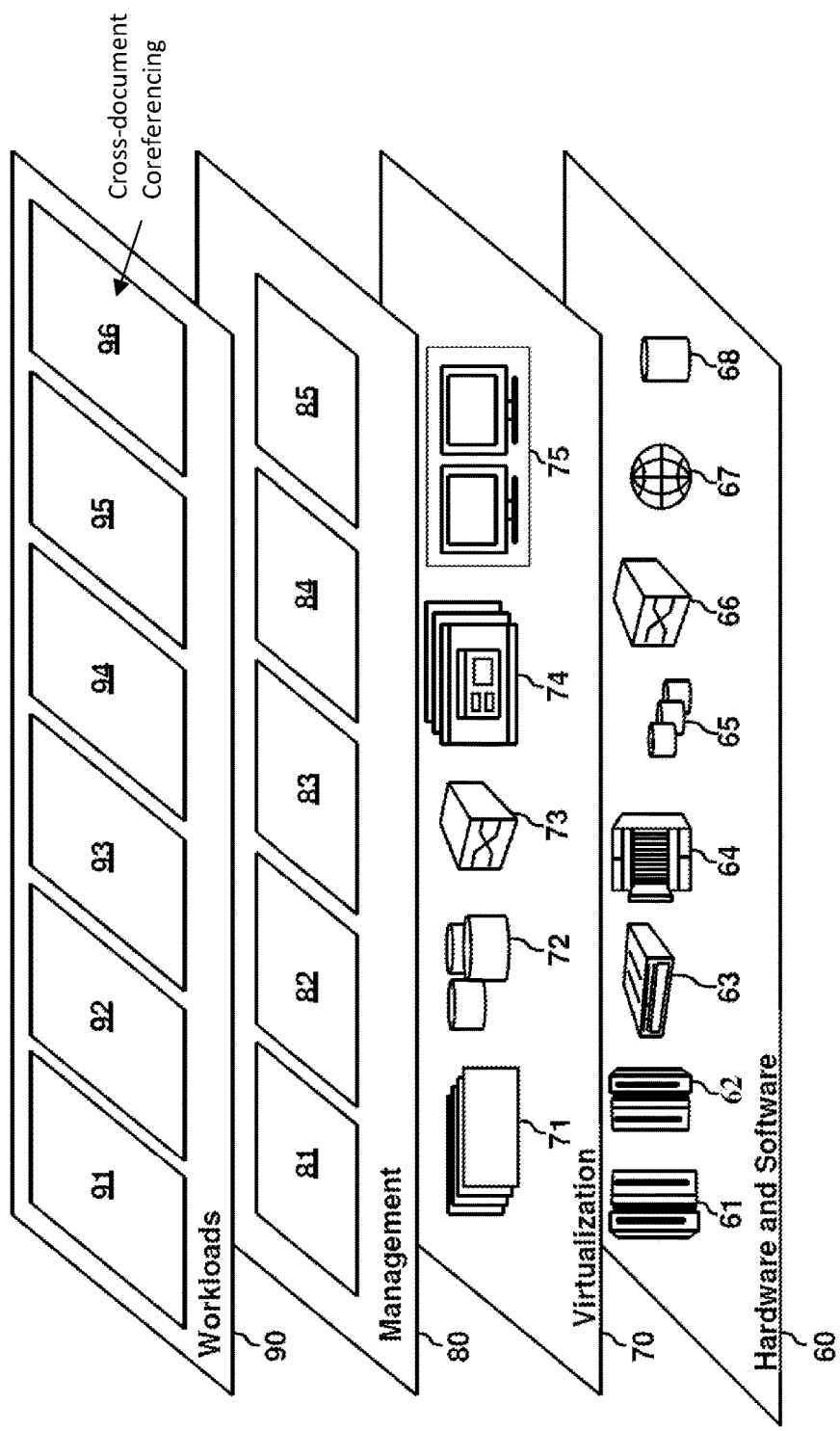
FIG. 14 depicts another view of a cloud computing platform according to one or more embodiments of the present invention.

Turning now to FIG. 12, a computer system 1200 is generally shown in accordance with an embodiment. The computer system 1200 can be an electronic, computer framework comprising and/or employing any number and combination of computing devices and networks utilizing various communication technologies, as described herein. The computer system 1200 can be easily scalable, extensible, and modular, with the ability to change to different services or reconfigure some features independently of others. The computer system 1200 may be, for example, a server, desktop computer, laptop computer, tablet computer, or smartphone. In some examples, computer system 1200 may be a cloud computing node. Computer system 1200 may be described in the general context of computer system executable instructions, such as program modules, being executed by a computer system. Generally, program modules may include routines, programs, objects, components, logic, data structures, and so on that perform particular tasks or implement particular abstract data types. Computer system 1200 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system 1200 has one or more central processing units (CPU(s)) 1201*a*, 1201*b*, 1201*c*, etc. (collectively or generically referred to as processor(s) 1201). The processors 1201 can be a single-core processor, multi-core processor, computing cluster, or any number of other configurations. The processors 1201, also referred to as processing circuits, are coupled via a system bus 1202 to a system memory 1203 and various other components. The system memory 1203 can include a read only memory (ROM) 1204 and a random access memory (RAM) 1205. The ROM 1204 is coupled to the system bus 1202 and may include a basic input/output system (BIOS), which controls certain basic functions of the computer system 1200. The RAM is read-write memory coupled to the system bus 1202 for use by the processors 1201. The system memory 1203 provides temporary memory space for operations of said instructions during operation. The system memory 1203 can include random access memory (RAM), read only memory, flash memory, or any other suitable memory systems.

The computer system 1200 comprises an input/output (I/O) adapter 1206 and a communications adapter 1207 coupled to the system bus 1202. The I/O adapter 1206 may be a small computer system interface (SCSI) adapter that communicates with a hard disk 1208 and/or any other similar component. The I/O adapter 1206 and the hard disk 1208 are collectively referred to herein as a mass storage 1210.

Software 1211 for execution on the computer system 1200 may be stored in the mass storage 1210. The mass storage 1210 is an example of a tangible storage medium readable by the processors 1201, where the software 1211 is stored as instructions for execution by the processors 1201 to cause the computer system 1200 to operate, such as is described herein below with respect to the various Figures. Examples of computer program product and the execution of such instruction is discussed herein in more detail. The communications adapter 1207 interconnects the system bus 1202 with a network 1212, which may be an outside network, enabling the computer system 1200 to communicate with other such systems. In one embodiment, a portion of the system memory 1203 and the mass storage 1210 collectively store an operating system, which may be any appropriate operating system, such as the z/OS or AIX operating system from IBM Corporation, to coordinate the functions of the various components shown in FIG. 12.

Additional input/output devices are shown as connected to the system bus 1202 via a display adapter 1215 and an interface adapter 1216 and. In one embodiment, the adapters 1206, 1207, 1215, and 1216 may be connected to one or more I/O buses that are connected to the system bus 1202 via an intermediate bus bridge (not shown). A display 1219 (e.g., a screen or a display monitor) is connected to the system bus 1202 by a display adapter 1215, which may include a graphics controller to improve the performance of graphics intensive applications and a video controller. A keyboard 1221, a mouse 1222, a speaker 1223, etc. can be interconnected to the system bus 1202 via the interface adapter 1216, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 1200 includes processing capability in the form of the processors 1201, and, storage capability including the system memory 1203 and the mass storage 1210, input means such as the keyboard 1221 and the mouse 1222, and output capability including the speaker 1223 and the display 1219.

In some embodiments, the communications adapter 1207 can transmit data using any suitable interface or protocol, such as the internet small computer system interface, among others. The network 1212 may be a cellular network, a radio network, a wide area network (WAN), a local area network (LAN), or the Internet, among others. An external computing device may connect to the computer system 1200 through the network 1212. In some examples, an external computing device may be an external webserver or a cloud computing node.

It is to be understood that the block diagram of FIG. 12 is not intended to indicate that the computer system 1200 is to include all of the components shown in FIG. 12. Rather, the computer system 1200 can include any appropriate fewer or additional components not illustrated in FIG. 12 (e.g., additional memory components, embedded controllers, modules, additional network interfaces, etc.). Further, the embodiments described herein with respect to computer system 1200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the present invention can be implemented using cloud computing technology in one or more examples. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated learning 96.

Further, embodiments of the present invention provide a practical application by facilitating systems to provide federated learning using anonymized data, where the data is anonymized using different syntactic algorithms at respective local sites in the federated learning system. Developing federated learning models and preserving their privacy are highly relevant in and applicable to domains such as the healthcare domain. Through experimental evaluation using at least two real-world datasets and varying parameter settings, the implementation has shown that embodiments of the present invention provide high model performance, while offering an acceptable level of privacy.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for performing cross-document coreference for a corpus of input documents, the computer-implemented method comprising:
    determining, by a processor, mentions in the input documents by parsing the input documents, each mention comprises a first vector and a second vector, the first vector comprising spelling data and the second vector comprising context data;
    generating, by the processor, a hierarchical tree by generating a plurality of leaf nodes, each leaf node corresponding to a respective mention that is determined;
    computing, by the processor, for each node, a similarity score based on the first vector and the second vector associated with each node;
    populating, by the processor, the hierarchical tree iteratively until a root node is created, each iteration comprising:
        merging two nodes that have the highest similarity scores, wherein merging two nodes comprises creating an entity node at a hierarchical level that is above the two nodes being merged, wherein merging two nodes comprises:
            generating a deep set of descendant mentions that are represented by the two nodes being merged; and
            filtering the set of descendant mentions, and storing a set of filtered mentions as being associated with the entity node; and
        computing the similarity score for the entity node; and
    identifying, by the processor, the nodes with the similarity scores above a predetermined value as entities for which coreference has been performed in the input documents.

2. The computer-implemented method of claim 1, wherein the set of descendant mentions include the mentions represented by the two nodes and the mentions of the nodes that are descendants of the two nodes in the hierarchical tree.

3. The computer-implemented method of claim 1, wherein the set of filtered mentions is determined using an attention neural network.

4. The computer-implemented method of claim 1, wherein merging the two nodes comprises using a neural network to encode the set of descendant mentions into a fixed length vector by transforming the descendant mention into corresponding scalar values using a non-linear transformation and summing the scalar values.

5. The computer-implemented method of claim 4, further comprising, filtering the set of descendant mentions to be encoded to select a subset of descendant mentions and encoding the selected subset of descendant mentions.

6. A system comprising:
    a memory; and
    a processor coupled with the memory, the processor programmed with machine learning algorithms and configured to perform a method for cross-document coreference, the method comprising:
        determining mentions in input documents by parsing the input documents, each mention comprises a first vector and a second vector, the first vector comprising spelling data and the second vector comprising context data;
        generating a hierarchical tree by generating a plurality of leaf nodes, each leaf node corresponding to a respective mention that is determined;
        computing for each node, a similarity score based on the first vector and the second vector associated with each node;
        populating the hierarchical tree iteratively until a root node is created, each iteration comprising:
            merging two nodes that have the highest similarity scores, wherein merging two nodes comprises creating an entity node at a hierarchical level that is above the two nodes being merged, wherein merging two nodes comprises:
                generating a deep set of descendant mentions that are represented by the two nodes being merged; and
                filtering the set of descendant mentions, and storing a set of filtered mentions as being associated with the entity node; and
            computing the similarity score for the entity node; and
        identifying the nodes with the similarity scores above a predetermined value as entities for which coreference has been performed in the input documents.

7. The system of claim 6, wherein the set of descendant mentions include the mentions represented by the two nodes and the mentions of the nodes that are descendants of the two nodes in the hierarchical tree.

8. The system of claim 6, wherein the set of filtered mentions is determined using an attention neural network.

9. The system of claim 6, wherein merging the two nodes comprises using a neural network to encode the set of descendant mentions into a fixed length vector by transforming the descendant mention into corresponding scalar values using a non-linear transformation and summing the scalar values.

10. The system of claim 9, further comprising, filtering the set of descendant mentions to be encoded to select a subset of descendant mentions and encoding the selected subset of descendant mentions.

11. A computer program product comprising a memory storage device having computer executable instructions stored thereon, the computer executable instructions when executed by a processing unit cause the processing unit to perform a method for performing cross-document coreference, the method comprising:
- determining mentions in input documents by parsing the input documents, each mention comprises a first vector and a second vector, the first vector comprising spelling data and the second vector comprising context data;
- generating a hierarchical tree by generating a plurality of leaf nodes, each leaf node corresponding to a respective mention that is determined;
- computing for each node, a similarity score based on the first vector and the second vector associated with each node;
- populating the hierarchical tree iteratively until a root node is created, each iteration comprising:
  - merging two nodes that have the highest similarity scores, wherein merging two nodes comprises creating an entity node at a hierarchical level that is above the two nodes being merged, wherein merging two nodes comprises:
    - generating a deep set of descendant mentions that are represented by the two nodes being merged; and
    - filtering the set of descendant mentions, and storing a set of filtered mentions as being associated with the entity node; and
  - computing the similarity score for the entity node; and
- identifying the nodes with the similarity scores above a predetermined value as entities for which coreference has been performed in the input documents.

12. The computer program product of claim 11, wherein the set of descendant mentions include the mentions represented by the two nodes and the mentions of the nodes that are descendants of the two nodes in the hierarchical tree.

13. The computer program product of claim 11, wherein merging the two nodes comprises using a neural network to encode the set of descendant mentions into a fixed length vector by transforming the descendant mention into corresponding scalar values using a non-linear transformation and summing the scalar values.

14. The computer program product of claim 13, further comprising, filtering the set of descendant mentions to be encoded to select a subset of descendant mentions and encoding the selected subset of descendant mentions.

* * * * *